(12) United States Patent
Chrin et al.

(10) Patent No.: US 6,600,741 B1
(45) Date of Patent: Jul. 29, 2003

(54) LARGE COMBINED BROADBAND AND NARROWBAND SWITCH

(75) Inventors: Christopher James Chrin, Lisle, IL (US); Kevin Eugene Dombkowski, Oswego, IL (US); Meyer Joseph Zola, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/276,188

(22) Filed: Mar. 25, 1999

(51) Int. Cl.[7] .................................................. H04J 3/16
(52) U.S. Cl. ........................ 370/375; 370/386; 370/466
(58) Field of Search ................................. 370/465, 466, 370/467, 401, 372, 375, 376, 386, 388, 352, 389

(56) References Cited

U.S. PATENT DOCUMENTS

| | | | | |
|---|---|---|---|---|
| 4,804,956 A | * | 2/1989 | Boxall | 340/2.21 |
| 5,204,857 A | | 4/1993 | Obara | 370/60 |
| 5,574,718 A | * | 11/1996 | Eckhoff et al. | 370/228 |
| 5,712,903 A | * | 1/1998 | Bartholomew et al. | 379/88.25 |
| 5,802,045 A | * | 9/1998 | Kos et al. | 370/352 |
| 6,069,947 A | * | 5/2000 | Evans et al. | 370/229 |
| 6,181,703 B1 | * | 1/2001 | Christie et al. | 370/410 |

FOREIGN PATENT DOCUMENTS

| | | | | |
|---|---|---|---|---|
| DE | 3816747 | | 11/1989 | H04L/11/00 |
| EP | 0312628 | | 4/1989 | H04L/11/20 |
| EP | 0676878 | | 10/1995 | H04L/12/56 |

* cited by examiner

Primary Examiner—Alpus H. Hsu
Assistant Examiner—Roberta Stevens

(57) ABSTRACT

Apparatus, and a method for switching digital signals of different protocols in a large switching network. Signals and different protocols are encapsulated in a common protocol by a set of input modules. The signals in the common protocol are then switched by a large central stage to a plurality of output modules, which then generate signals in the correct protocol. Narrow-band signals are converted into broadband signals, so that the central stage switches only broadband signals. This simplifies the design of the central stage, while still making it possible to have a very large and economical central stage switch. Advantageously, this arrangement allows a single large switch to switch large quantities of traffic in a plurality of protocols.

15 Claims, 23 Drawing Sheets ical Field

LARGE COMBINED BROADBAND AND NARROWBAND SWITCH

RELATED APPLICATION

This Application is related to an Application entitled, "Flexible Telecommunications Switching Network" being filed by C. J. Chrin and M. J. Zola, concurrently, with this Application, and assigned to the same assignee.

Technical Field

This invention relates to digital telecommunications switching systems, and more specifically, to narrowband and broadband digital telecommunications switching systems.

Problem

As is well known, the demands for telecommunications services are changing rapidly. Many of these demands are for services such as video, which require a much broader band than the conventional audio band. The combination of cable television distribution systems with telephone and other customer premises equipment telecommunications systems, is making more and more available a loop plant capable of transmitting broadband signals to individual customers. At the same time, the development of switching systems which handle both broadband and narrowband signals in an efficient and integrated way, has not kept pace with this demand. Accordingly, a problem of the prior art is that there is no satisfactory large switching system for processing both narrowband and broadband traffic efficiently and an integrated fashion.

Solution

The above problem is solved, and an advance is made over the prior art in accordance with this invention, wherein a core central network receives inputs in a standard format from a plurality of connecting modules, and switches these signals among the modules. In order to handle a large amount of broadband traffic efficiently, these signals each carry a substantial number of base band channels combined into a single signal. In accordance with Applicant's preferred embodiment, the standard signal is a signal that carries 2.048 Mb per second payload, the equivalent of 32 DS0 voice channels. Each such signal is switched through the central core entity without changing the information in the payload.

In accordance with one feature of Applicants' invention, when a narrowband signal, i.e., a single voice channel, is to be switched through the core, this narrowband signal occupies only a single DS0 payload, with the rest of the signal being occupied by "fill" bits. Advantageously, this allows individual voice channels to be switched through the central core from any connected module to any other connected module.

In accordance with Applicants' preferred embodiment, the modules connected to line and trunk signals convert these signals into standard format signals. These modules include a microprocessor based switch, wherein the microprocessor receives input pulse code modulated signals generated by standard line and trunk interface cards, and converts these into standard intermediate stage signals, and switches signals from particular lines and trunks to a standard signal destined for the appropriate module at the other end. In addition, output interface units for interfacing between facilities such as SONET/SDH, (Synchronous Optical Network/Synchronous Digital Hierarchy) facilities, and the cores which are connected to the core switch, with the conununications being the standard signals. These output interface units convert between the standard signal and an ATM, or IP signal, for transmission over virtual channels of the SONET facilities.

The standard signals in this embodiment are VT2 signals and carry 32 64 Kbit channels, and are further characterized in the discussion of FIGS. 17–20.

Advantageously, using 1999 technology, a core network for supporting 12288 (768×16), VT2 signals, can be housed on a single custom silicon chip. This is a great advantage compared to disbursing this circuitry over many chips, since intra-chip connections do not require interface circuits, and can use the very narrow circuit interconnection lines allowable on a silicon chip. Advantageously, by allowing one narrowband signal to occupy to a full VT2 signal on a full interconnectivity among modules connected to the core network, is possible without requiring the core network to switch anything other than VT2 signals.

In accordance with another feature of Applicants' invention, connections to prior art modules is made possible. Prior art modules such as the communication module of a 5ESS® switch, manufactured by Lucent Technologies Inc., communicate via proprietary link signals, which are encapsulated at the input of the core network into VT2 signals. These NCT links can carry both narrowband and broadband signals. The communication module can be connected to a switch module of a 5ESS® switch.

In accordance with another aspect of Applicants' invention, a group of modules are interconnected by a plurality of center stage modules as in a Clos network, a well-known arrangement for guaranteeing absence of blocking from any input to any output. Advantageously, a large non-blocking network is made feasible by this arrangement.

BRIEF DESCRIPTION OF THE DRAWINGS(S)

GENERAL DESCRIPTION

Figure 14:
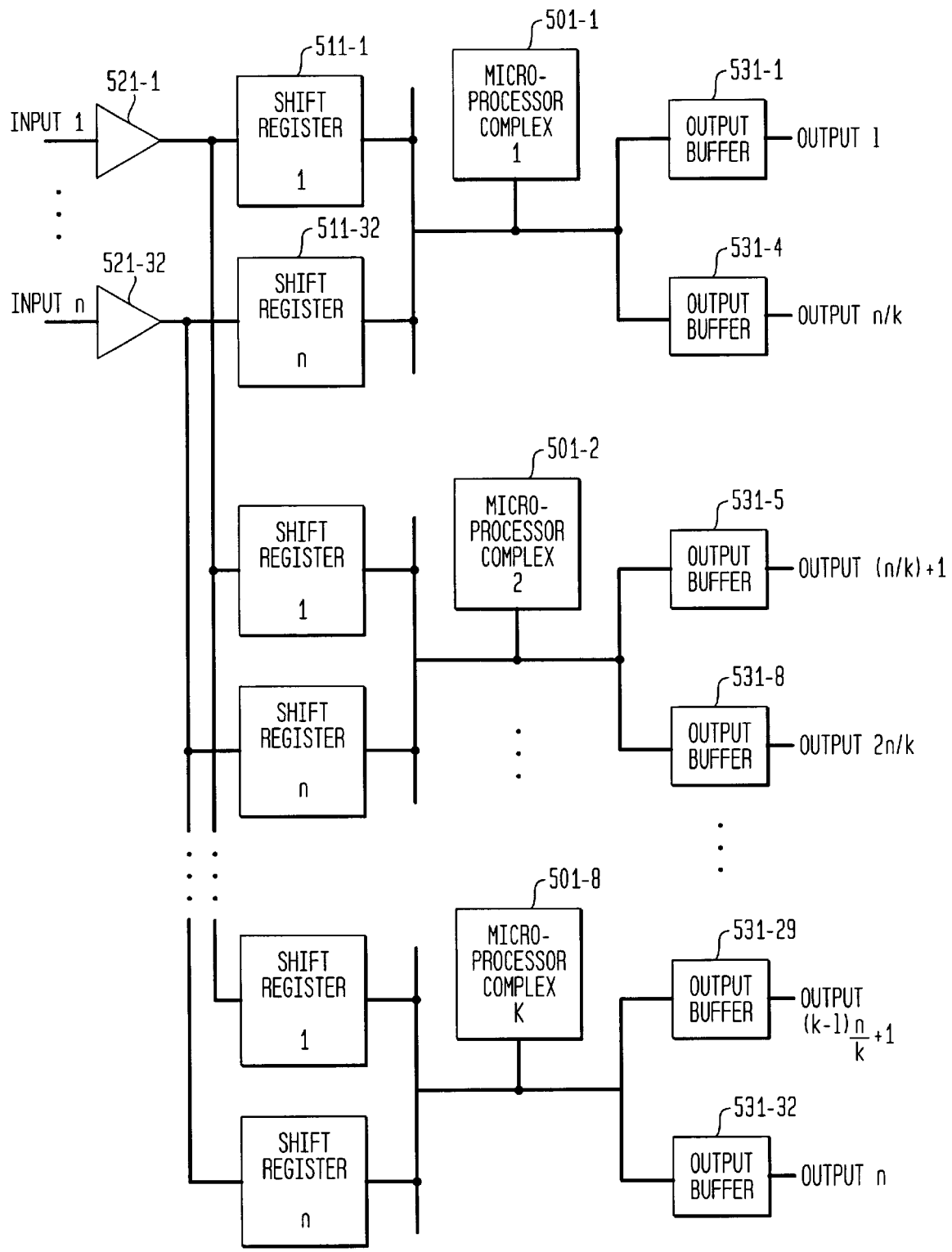
FIG. 14 is a block diagram, illustrating the arrangement for expanding the size of a microprocessor control switch through replication of microprocessor complexes.
Figure 15:
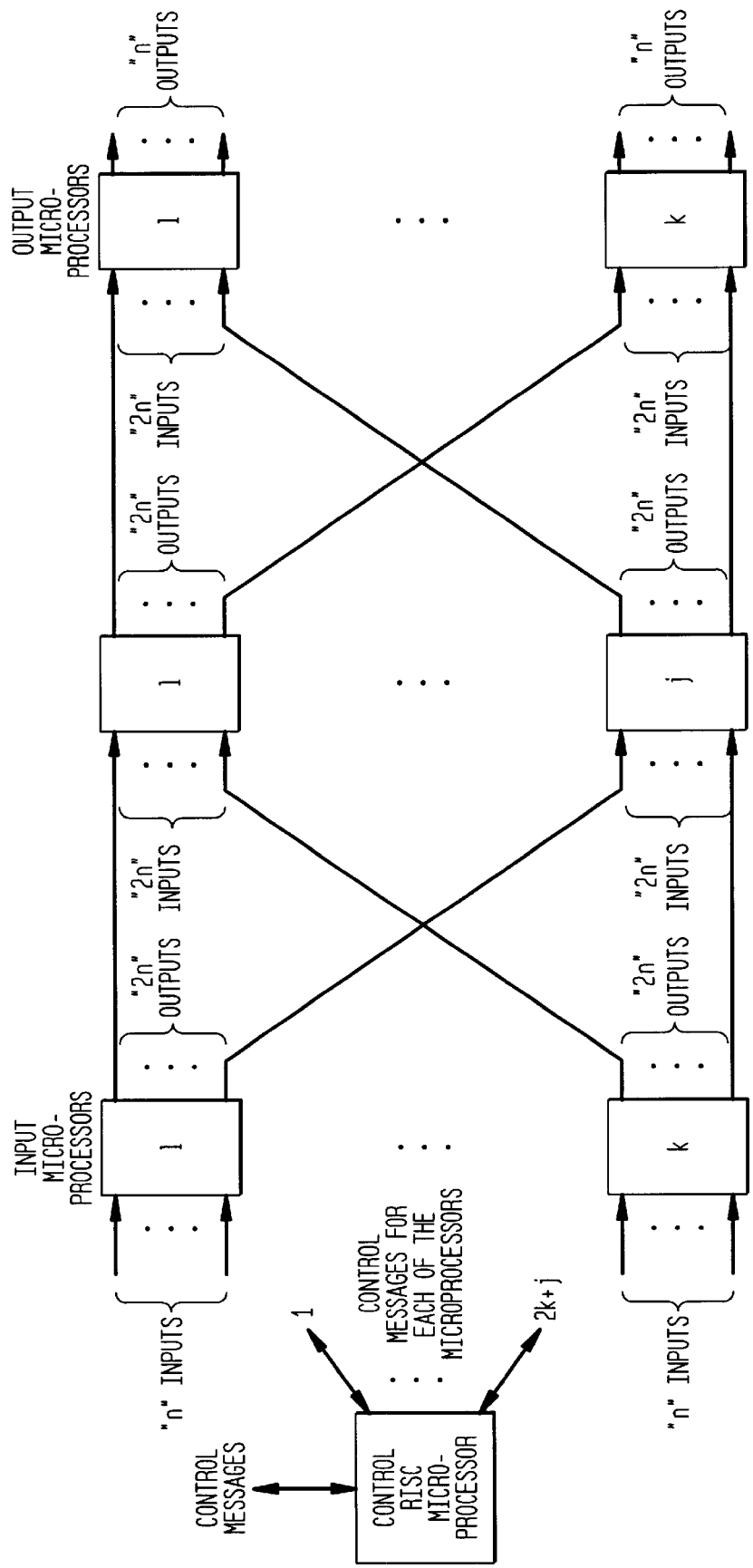
FIG. 15 shows a CLOS network of switching microprocessors.
Figure 16:
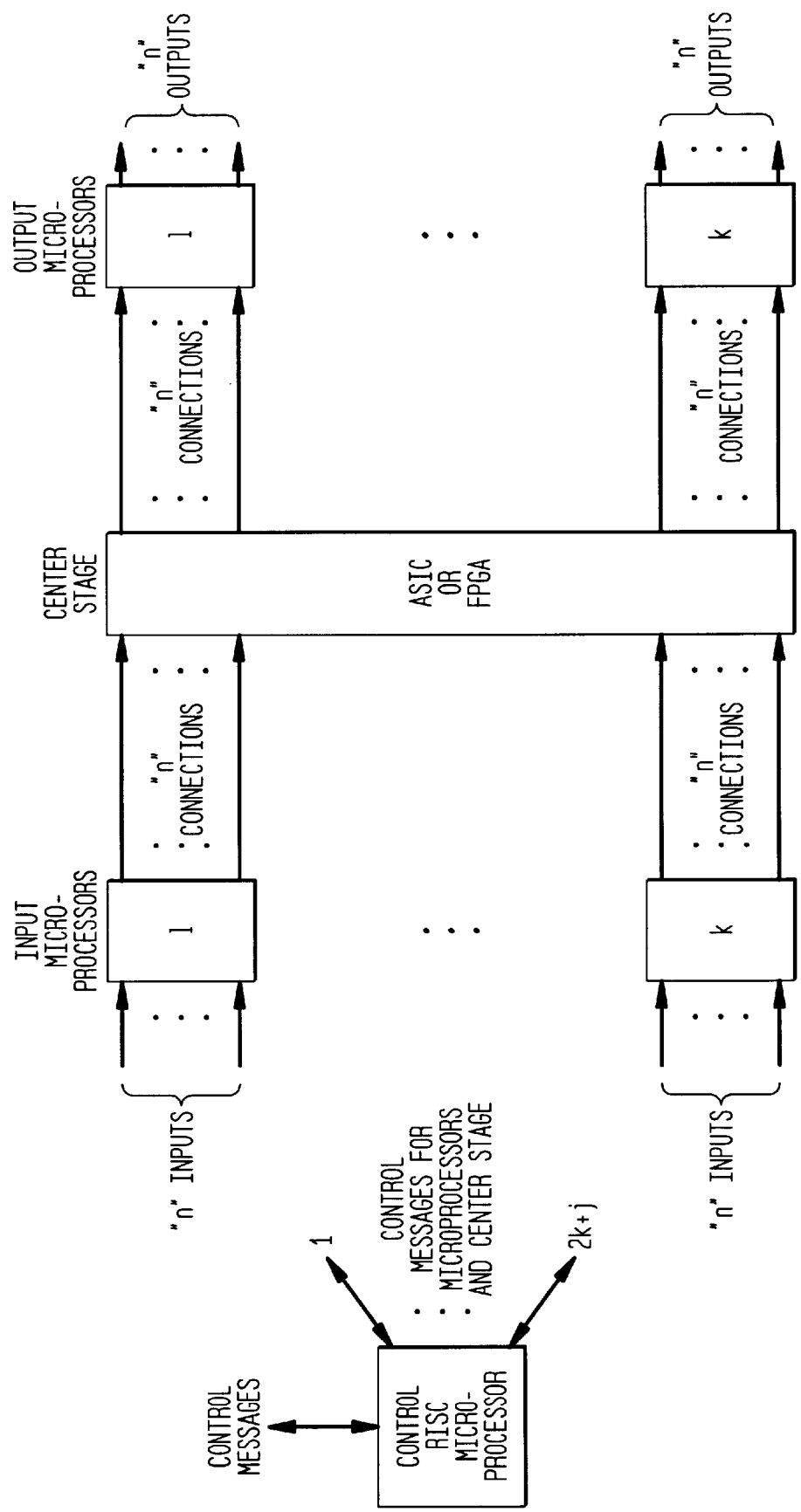
FIG. 16 is a conceptual diagram, illustrating a 3-stage network for use as a combined circuit and packet switch.

The descriptions of FIGS. 1–14 relate to single-stage networks for performing the TSI function, TMS function, and for performing within the same module, also functions of packet switching for switching ATM signals, and signals in the Internet Protocol, (IP). FIG. 14 shows how a group of smaller modules can be paralleled to perform the function of a larger module. FIG. 15 shows a Clos network made of the modules described earlier. FIG. 16 is a conceptual diagram, illustrating a 3-stage network for use as a combined circuit and packet switch. The subject matter of FIGS. 17–20, which is the bulk of the claimed subject matter of this Application, uses the modules described in the earlier part of the Application, but interconnects these modules with a novel type of center stage, to create a very large switch.

DETAILED DESCRIPTION

This specification describes an arrangement for, and method of implementing multiple hardware functionality by appropriate software on a Reduced Instruction Set Computer, (RISC) microprocessor. Although this is described in terms of a RISC microprocessor, other types of microprocessor implementations, (e.g., Complex Instruction Set Computer), (CISC) can also be used. Multiple functions can reside on the same microprocessor simultaneously, or only a single function can be provided. The determination of the type of treatment each input and/or output shall receive, (e.g., Time-Slot Interchange (TSI), Time Multiplexed Switch (TMS), Cross-connect (XCON), Asynchronous Transfer Mode (ATM) Switch, Internet Protocol (IP) Router, Dynamic Synchronous Transfer Mode (DTM), Frame Relay (FR) switch, etc.), is determined by, and can be reconfigured by, software control. Conversion between input to output formats can also be provided, e.g., a circuit switched PCM format can be converted to/from ATM format. A method is identified for using multiple microprocessors for building very large configurations for applications which do not fit on a single microprocessor.

Other advantages include:
1. Little or no VLSI Required—faster time to market (eliminates development).
2. Microprocessor Self Test—(reduces investment in chip and board test tools).
3. Follows Moore's Law Technology Curve Directly—(graceful evolution).
4. Core Architecture Usable by Multiple Applications.
5. Results in Lower Development Effort—(contributed to by all of the above).

Among the basic techniques used are the following:
1. Input bit streams are clocked into serial in, parallel out shift registers and then read out in parallel onto the microprocessor data bus under control of the microprocessor address bus.
2. This data, is then stored in the internal microprocessor cache memory which may be expanded by a level 2 cache on or outside the microprocessor chip, and/or an auxiliary memory outside the microprocessor chip, and is manipulated under stored program control in such a way as to provide the desired switching function.
3. The more frequently used sections of the stored program are, advantageously, stored in caches.
4. The resulting outputs are read out in parallel to parallel in, serial out shift registers, and then clocked out onto serial bit streams.

Figure 1:
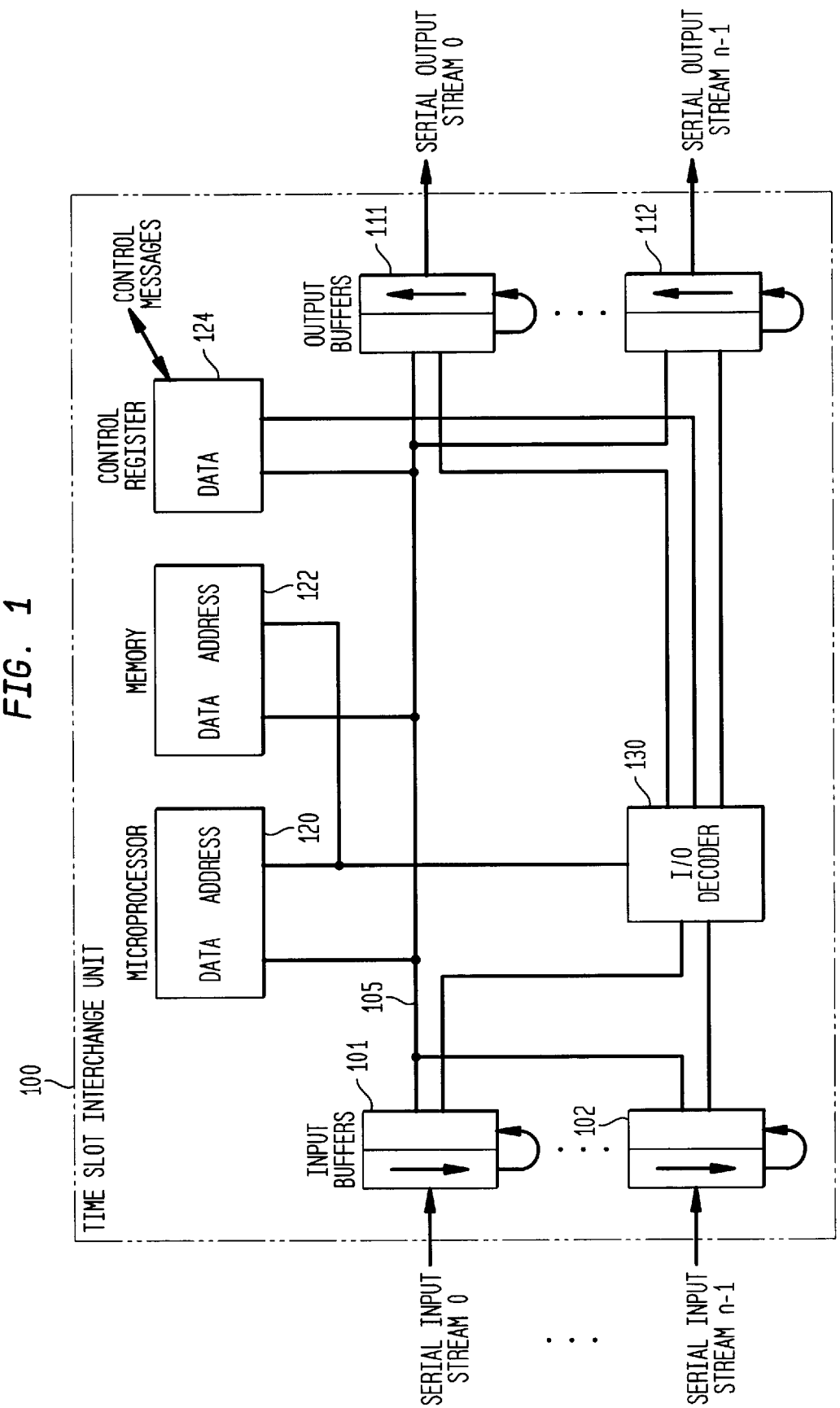
FIG. 1 is a block diagram of a microprocessor based time-slot interchange module.

FIG. 1 is a block diagram of the basic system architecture. The heart of the system is a Microprocessor containing on board program and data caches and external Input/Output consisting of serial to parallel shift registers as Input Buffers, and parallel to serial shift registers as Output Buffers. An Input/Output decoder under the control of the Microprocessor selects the Input Buffer which puts its data on the Data Bus or the Output Buffer, which reads the data from the data bus. The Control Register is used to receive and transmit control messages from/to the outside world. The external Memory is used to store back-up and maintenance code, as well as data structures which are too large to fit into the cache. Microprocessor software is used to provide switching functionality which has traditionally been provided by hardware implementation. Thus, multiple diverse functions can be provided concurrently by a single microprocessor architecture. By changing the resident software, different sets of functions can be provided.

FIG. 1 shows the input and output data streams of a time-slot interchange unit 100 in accordance with Applicant's invention. In one preferred embodiment of Applicant's invention, a 300 MHZ PowerPC® EC 603e microprocessor, manufactured by the Motorola Corporation, can switch 192 serial input and output streams, each consisting of 32 time-slots at a bit rate of 2.048 Mbits per second. The input comprises n serial input streams, stream zero being connected to input buffer 101, . . . , and serial input stream, n−1, being connected to input buffer 102. The first input stream is collected in a shift register of input buffer 101, and then transmitted in parallel, sequentially to a four-stage, sixty-four bit per stage, buffer. The last stage of this buffer is connected to a series of sixty-four tri-state bus drivers for driving parallel bus 105. Also connected to parallel bus 105, are n output buffers 111, . . . , 112. These outputs buffers also comprise four-stage, sixty-four bit registers, the input stage of which is connected to sixty-four bus receivers connected to bus 105, and the output stage of which is connected to a shift register for generating a serial output stream. Also connected to bus 105, is microprocessor 120 which accepts inputs in bursts of 256 bits as four associated 64-bit data bus reads, from each of the n input buffers 101, . . . , 102, under the control of the program stored in the microprocessor. Similarly, the microprocessor delivers bursts of 256 bits as four associated 64 bit data bus writes to each of the n output buffers after having generated the output burst through the reading of the inputs under the control of a control map, and of the program of the microprocessor.

An I/O decoder unit 130, under the control of the microprocessor, is used to gate the tri-state outputs of the input buffers onto the bus, and to gate the output of the bus into the n output buffers 111, . . . , 112. The I/O decoder receives inputs from the microprocessor address bus.

Also connected to bus 105, is a memory 122 for storing infrequently used data and program text such as data required for performing tests or diagnostics, non-cached TSI code, and as a backup for data stored in the microprocessor cache, such as the microprocessor program text and the path memory. Also connected to bus 105, is control register 124, which interfaces with a call processing controller or other switches of the telecommunications network, and receives and transmits control messages.

Figure 2:
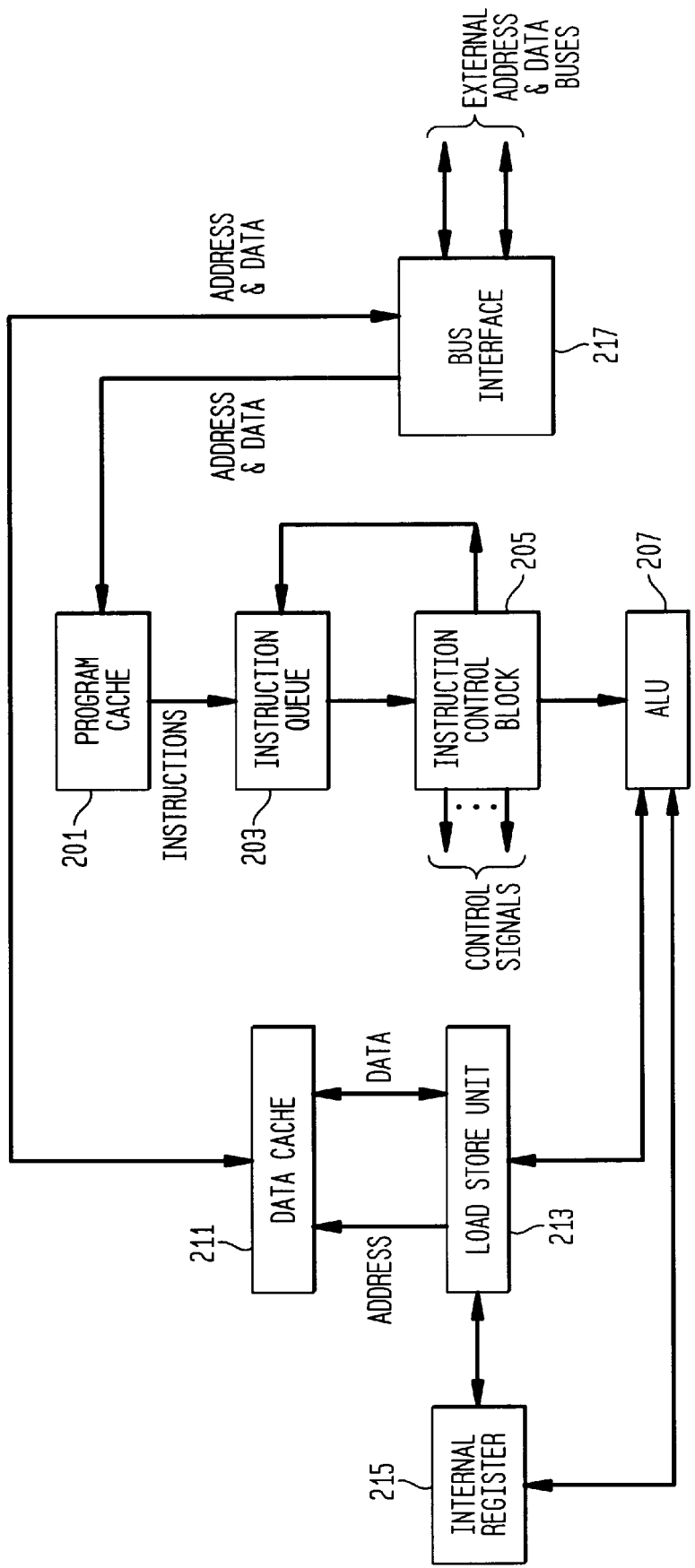
FIG. 2 is a block diagram of the internal microprocessor architecture of the TSI module.

FIG. 2 is a block diagram of those key parts of the microprocessor which are pertinent to the understanding of Applicant's invention. The microprocessor contains a program cache 201 for storing the control program which controls the operations of the time-slot interchange unit. The output of the program cache goes to an instruction queue 203 for storing a plurality of instructions in order to allow for the rapid execution of simple loops that is made possible using pipelining techniques. The instruction queue interacts with an instruction Control Block 205, to deliver the appropriate instructions to arithmetic and logic unit (ALU) 207. The ALU executes its received instructions and operates to perform the steps required by the instruction, by controlling load store unit 213, which in turn accesses a data cache 211. ALU 207 also controls a group of internal registers 215, for short term storage, and for the control of the microprocessor. A bus interface 217 communicates between bus 105, (FIG. 1), and within the microprocessor with the data cache 211, and for changes or back-up in the software, also communicates with program cache 201.

Figure 3:
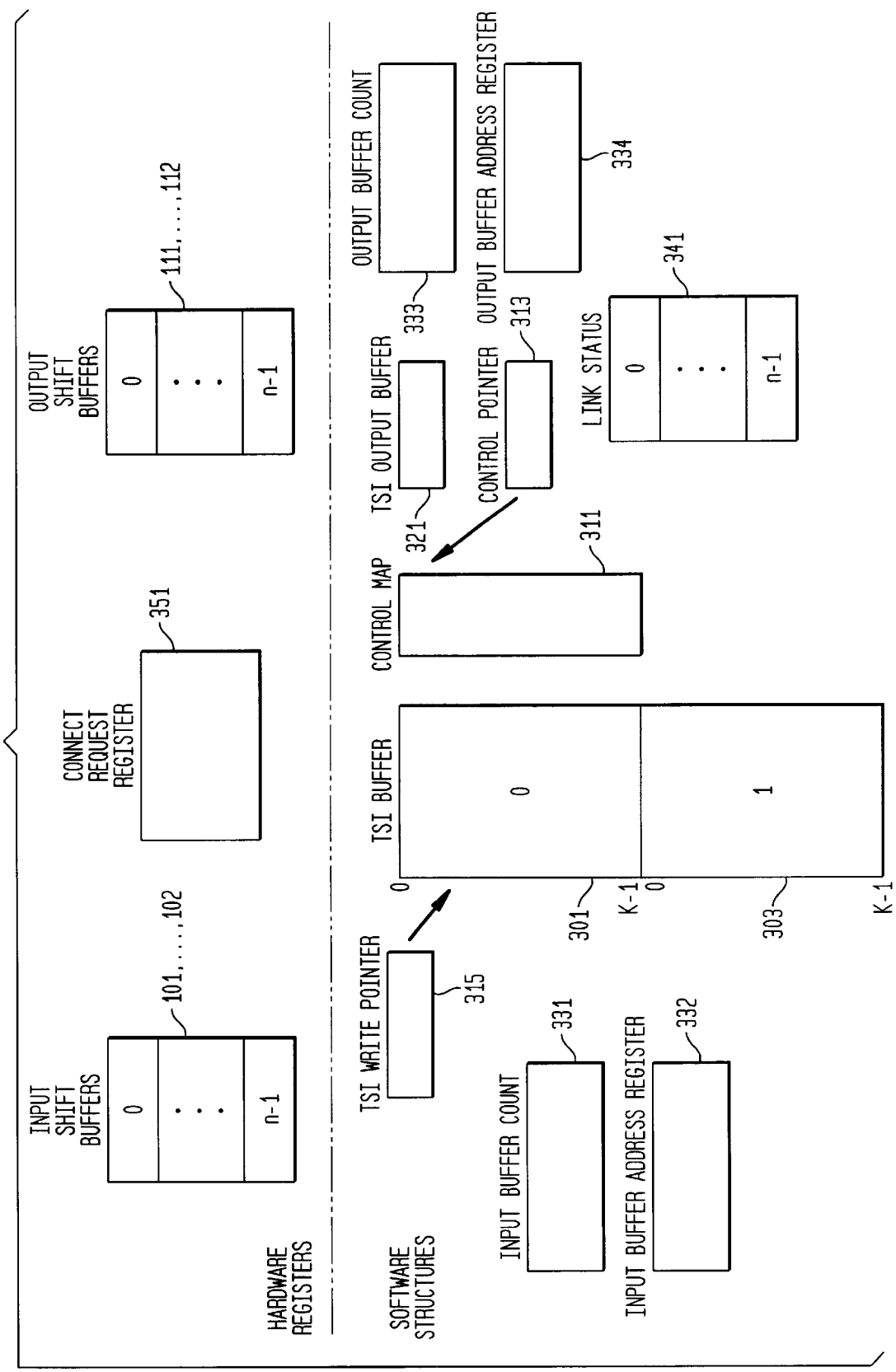
FIG. 3 is a block diagram of memory and buffer layouts for the TSI module.

FIG. 3 shows pertinent memory data stored in data cache 211 of microprocessor 120, and in hardware registers. The contents of the data cache contain, among other items, the data received from input buffers 101, . . . , 102, and the data to be delivered to output buffers 111, . . . , 112. Data received from the input buffers 101, . . . , 102, is stored in TSI buffer 301 or 303. The data from the various input buffers is stored sequentially in one of these buffers in Applicant's preferred embodiment. In order to handle n×64 kilobit per second connections, the TSI buffer contains buffer 301, and a second buffer 303, for storing another frame of this serial input data. Buffers 301 and 303 are used alternately. Control map 311 is used to control the reading of the contents of TSI buffers 301 or 303 in order to generate an output for storage in the TSI output buffer 321, for transmission to one of the output buffers 111, . . . , 112. TSI write pointer 315 is used to keep track of where the next input from one of the input buffers 101, . . . , 102, is to be stored in TSI buffer 301 or 303. Control pointer 313 is used to point to the appropriate portions of control map 313 in order to control accessing the TSI buffer in order to obtain the time-slots that are required to fill the TSI output buffer 321. Input buffer count 331 is used to control the cycling for accepting inputs from the appropriate one of the n input buffers 101, . . . , 102, selected by input buffer address register 332, and output buffer count 333 is used to control the distribution of an output collected in TSI output buffer 321 to one of the n output buffers 111, . . . , 112, selected by output buffer address register 334. Link status memory 341 is used to identify any of the n input links or any of the n output links that are out of service. This status can be checked prior to accepting an input from one of the n input buffers 101, . . . , 102, or prior to sending an output to one of the output buffers 111, . . . , 112.

The control map is altered under the control of the program of the microprocessor when the microprocessor receives a control message from connect request register 351 within the control register 124 of FIG. 1, the control message representing a request to establish or disconnect a connection in the time-slot interchange unit. The process of controlling the control map is well known in the prior art.

Figure 4:
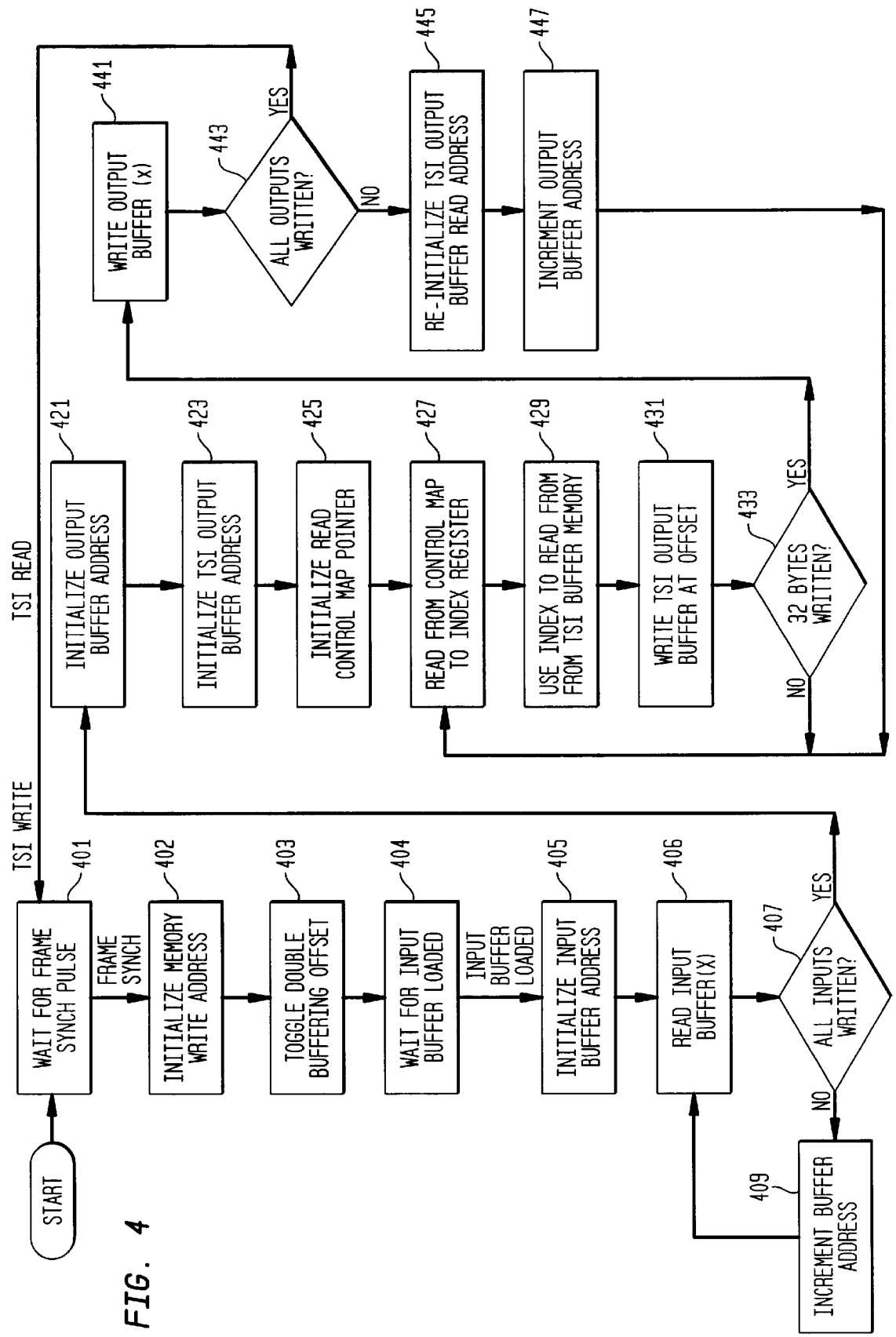
FIG. 4 is a flow diagram of the program for controlling the TSI module.
Figure 5:
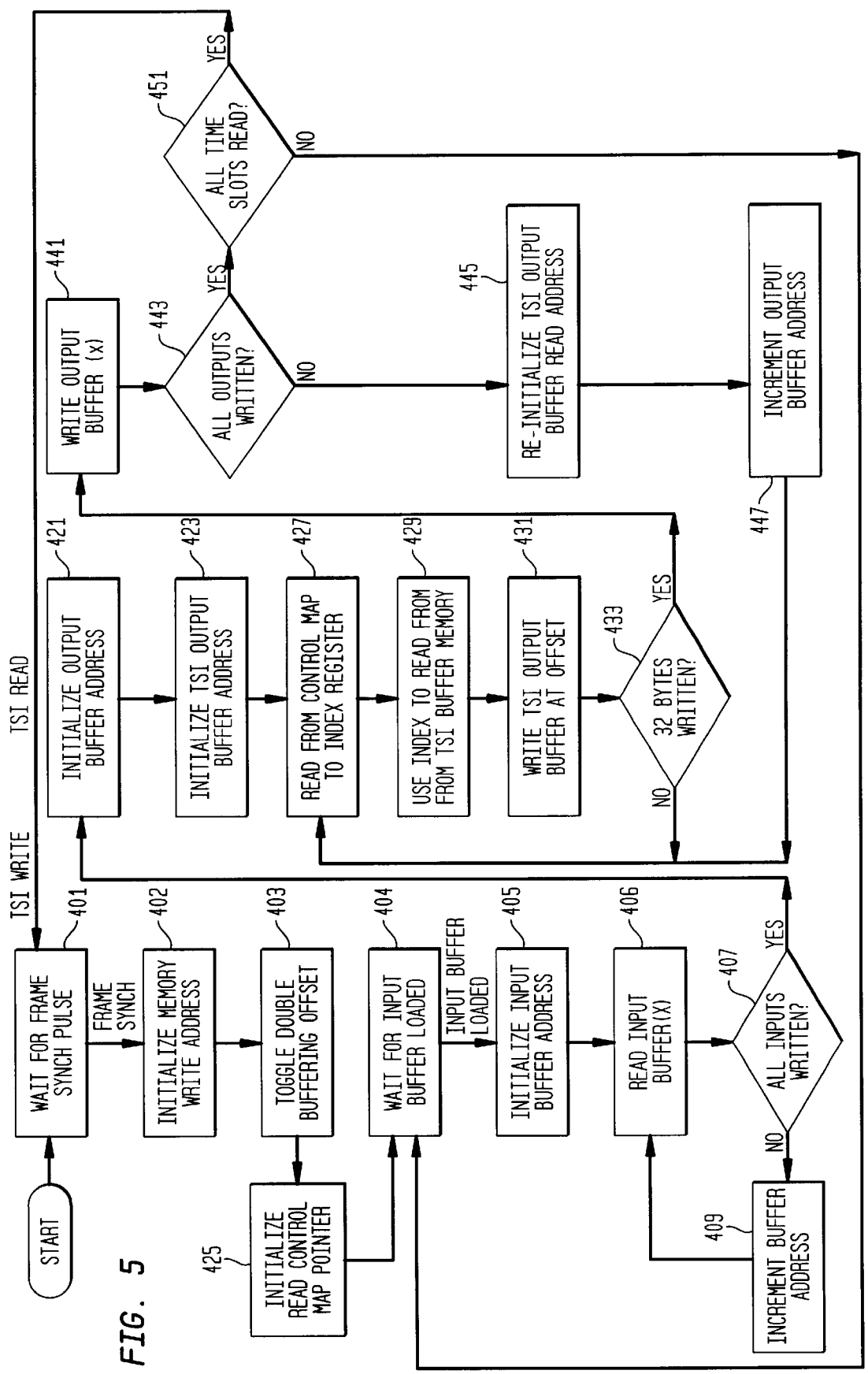
FIG. 5 shows modifications of the program of FIG. 4, for the case in which the multiple sub-frames are encountered between each frame synchronizing pulse.

FIG. 4 is a flow diagram describing the operation of the program for implementing a time-slot interchange (TSI) in accordance with Applicant's invention. The process starts with the microprocessor waiting for a frame synchronization pulse (Block 401). When the frame synchronization pulse arrives, it signals the beginning of the synchronized loading of the input buffers 101, . . . , 102, from the serial input streams, and triggers several initialization steps. The memory write address, (TSI write pointer 315), is initialized, (Action Block 402), so that the correct location in the TSI buffer 301 and 303 is established for writing the information from the input buffers 101, . . . ,102. The double buffering offset is toggled (Action Block 403), to choose either frame memory 301 or 303 in the TSI buffer for storing the input data on alternate frames. The microprocessor then waits for an input buffer loaded signal, (Action Block 404), which establishes that the buffers 101, . . . , 102, are full, and then the input buffer address is initialized, (Action Block 405), to point to the first input buffer 101. In order to guarantee that Action Block 406 reads new data from the input buffer, and not stale cached data from a previous cycle, Action Block 405 invalidates the cache data associated with the input buffer address before initiating the read. The input buffer pointed to by the input buffer address is then read, (Action Block 406), in a burst as four connected 64 bit data bus operations, and stored in the microprocessor cache memory in either TSI buffer 301 or 303, depending on the double buffering offset. Test 407 determines whether all inputs for this frame have been written. If not, then the buffer address is incremented, (Action Block 409), and the next buffer is read into the TSI buffer, (Action Block 406, previously described). This loop is continued until the results of test 407 indicates that all inputs for this frame have been written.

At this point, the TSI read cycle begins. The output buffer address 334 is initialized, (Action Block 421), the TSI output buffer address is initialized, (Action Block 423), and the control map pointer 313 is initialized to point to the top of the control map, (Action Block 425). The contents of the control map are read to an index register, (Action Block 427), and the index register is used to read the eight bit time-slot from the TSI buffer, (Action Block 429); (frame 301 or 303 is accessed depending on the double buffering offset established in Action Block 403). The read byte is then written into the TSI output buffer in the cache, at the appropriate offset, (TSI output buffers 321), (Action Block 431), determined by which of the 32 bytes is being written. Test 433 is used to determine whether 32 bytes have been written; if not, Action Block 427 is re-entered, and the loop repeats Action Blocks 427, 429, 431. When 32 bytes have been written, as indicated by a positive result of test 433, then 32 bytes are written from the cache, (Action Block 441), by a data cache block flush operation in a burst of four connected 64 bit data bus writes into the output buffer 111, . . . , 112, specified by the output buffer address 334. Test 443 determines whether all outputs have been written. If not, then the TSI output buffer read address is re-initialized, (Action Block 445). The output buffer address, (output buffer address 334), is then incremented, (Action Block 447), and the loop for writing into the output buffer is re-entered in Action Block 427. If test 443 indicates that all outputs have been written, then the work for this frame is finished, and the processor goes back to Block 401 to wait for the next frame synchronization pulse.

The above flow chart provides double buffering for all time-slots whether they represent n×64 kilobits per second signals such as 256 kilobit data, or a single 64 kilobit per second voice or data time-slot. If the additional frame delay introduced by the double buffering is not desired for the single 64 kbit/sec voice or data time-slot, then the flow chart can be modified to provide selective double buffering, i.e., the single voice or data time-slot is not double buffered. Such single buffered time-slots are marked in the control map 311, which causes the time-slot to be read from the other one of the two TSI buffer frames 301 and 303, by negating the effect of the double buffer offset. Thus, single buffered time-slots may be read out of the opposite frame from the double buffered time-slots.

Generalized TSI Flow

The flow chart shown in FIG. 4 is transversed only once per frame because each of the serial input streams was assumed to consist of 32 time-slots, which in the present implementation is written into the microprocessor cache in a single 32 byte burst, as described when Action Block 406 was discussed. Relatively simple modification of FIG. 4 is required and illustrated in FIG. 5, in order to accommodate higher bandwidth serial links:

(1) Another decision state 451 is required after the "Yes" output of decision state 443 in FIG. 4. This determines whether the entire frame of time-slots has been processed. If "Yes", we return to the wait state of Block 401. If "No", we return to the wait for input buffer loaded block 404 for the next burst of 32 time-slots.

(2) The initialize read control map pointer, Action block 425, is moved out of the TSI read loop to the beginning of the TSI write cycle, (after the initialized memory write address, Action Block 402), since the entire frame has not yet been written.

The RISC microprocessor hardware of FIG. 1, the block diagram of FIG. 2, and the programmer data model of FIG. 3, can also be used for implementing a Time Multiplexed Switch, (TMS). The basic difference is that a TSI application requires the storing and maintaining in memory of either one or two frames of time-slots, (single or double buffered applications), whereas a TMS application requires the switching of the time-slots as soon as possible after they appear at the input to the TMS. This means that after the serial input streams appearing at 101, . . . , 102, (which have been written into the TSI buffer of FIG. 3), are read out to the serial output streams 111, . . . , 112, their storage in the TSI buffer is no longer necessary. Therefore, subsequent write bursts into this buffer during the frame interval can overwrite the old data. This means that less memory is required for the TMS application than the TSI application, since only 32 bytes, (the write/burst size), per serial input are required rather than one or two frames of memory. Also, double buffering is not required for n×64 kbits per second, because the time-slots are read out immediately, and thus, there is no possibility of the time-slots getting out of sequence.

Figure 6:
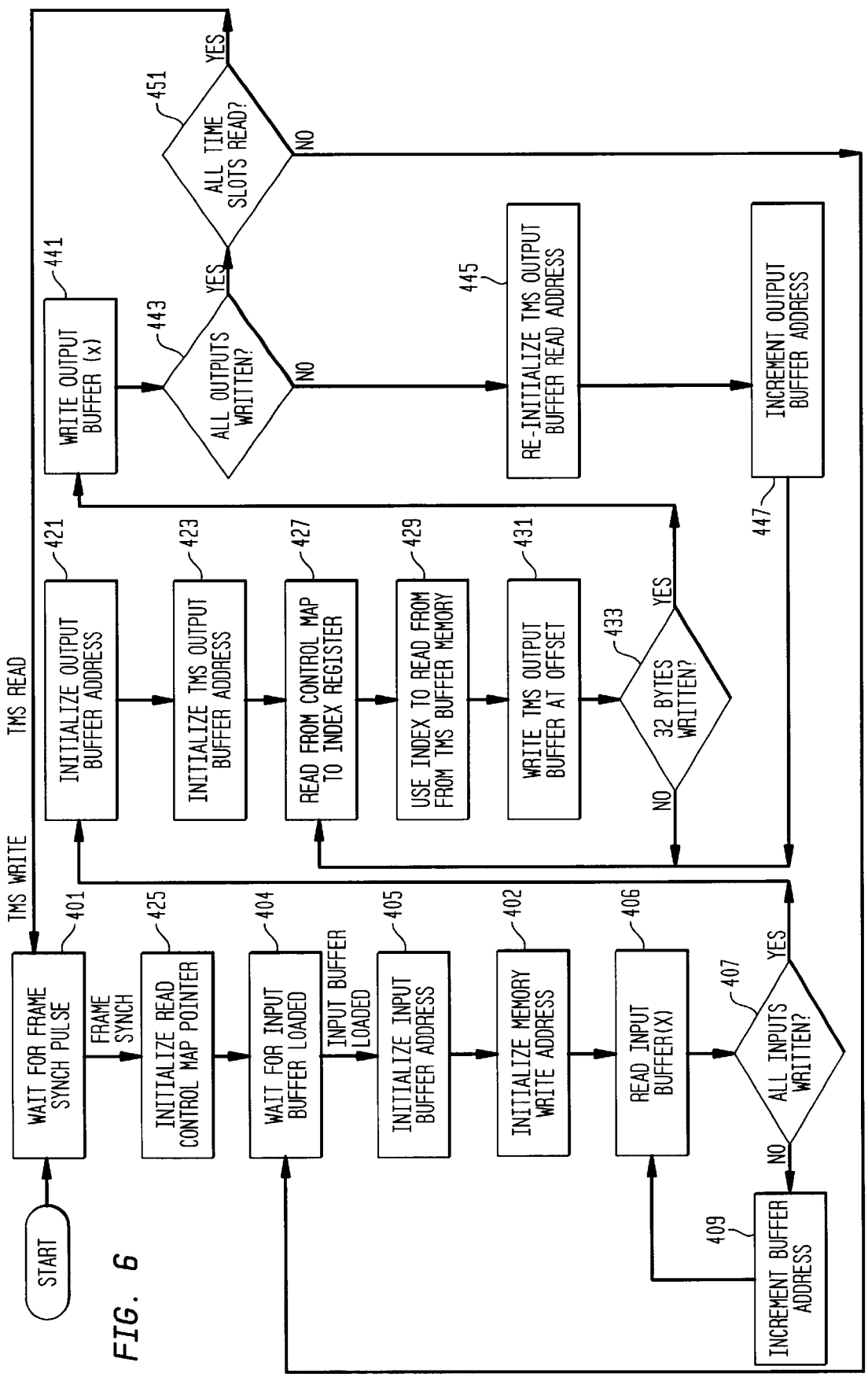
FIG. 6 illustrates the program for controlling the microprocessor, acting as a time multiplexed switch.

FIG. 6 is a flow chart for implementing a TMS. It is similar to the TSI basic flow chart (FIG. 4), and incorporates the changes described earlier for generalized TSI flow, as well as the differences described above for a TMS. To help the reader, the same action is given the same number as in FIG. 4. For a TMS, high bandwidth facilities, much larger than the 2.048 Mbits per second assumed for the basic TSI flow chart, are required. This requires the addition of test 449 in FIG. 6 in order to handle the entire frame, and moving the initialize read control pointer, (Action Block 425), from the TSI read cycle to the frame initialization portion near the beginning of TMS write cycle of FIG. 6. These two steps are the same as those described for a generalized TSI flow.

To implement TMS functionality, the only two changes to the flow chart are:

(1) Move Action Block 402 from the frame initialization portion of the TSI write to the buffer loaded inner loop, so it can overwrite the previous burst, since as described in the previous paragraph, this data has already been output; and (2) eliminate Action Block 403, which is used to implement double buffering. The TMS flow chart of FIG. 6 implements the time multiplexed switching function.

A variation on writing the input buffers 101, . . . , 102, sequentially into cache, is that instead of taking a 32 byte burst from a single input buffer, 8 bytes from each of four input buffers are written. This has the advantage of reducing the number of bytes of buffering required by input buffers 101, . . . , 102, from 32 bytes to 8 bytes per buffer. Taking 16 bytes from each of two buffers can also be implemented.

Figure 7:
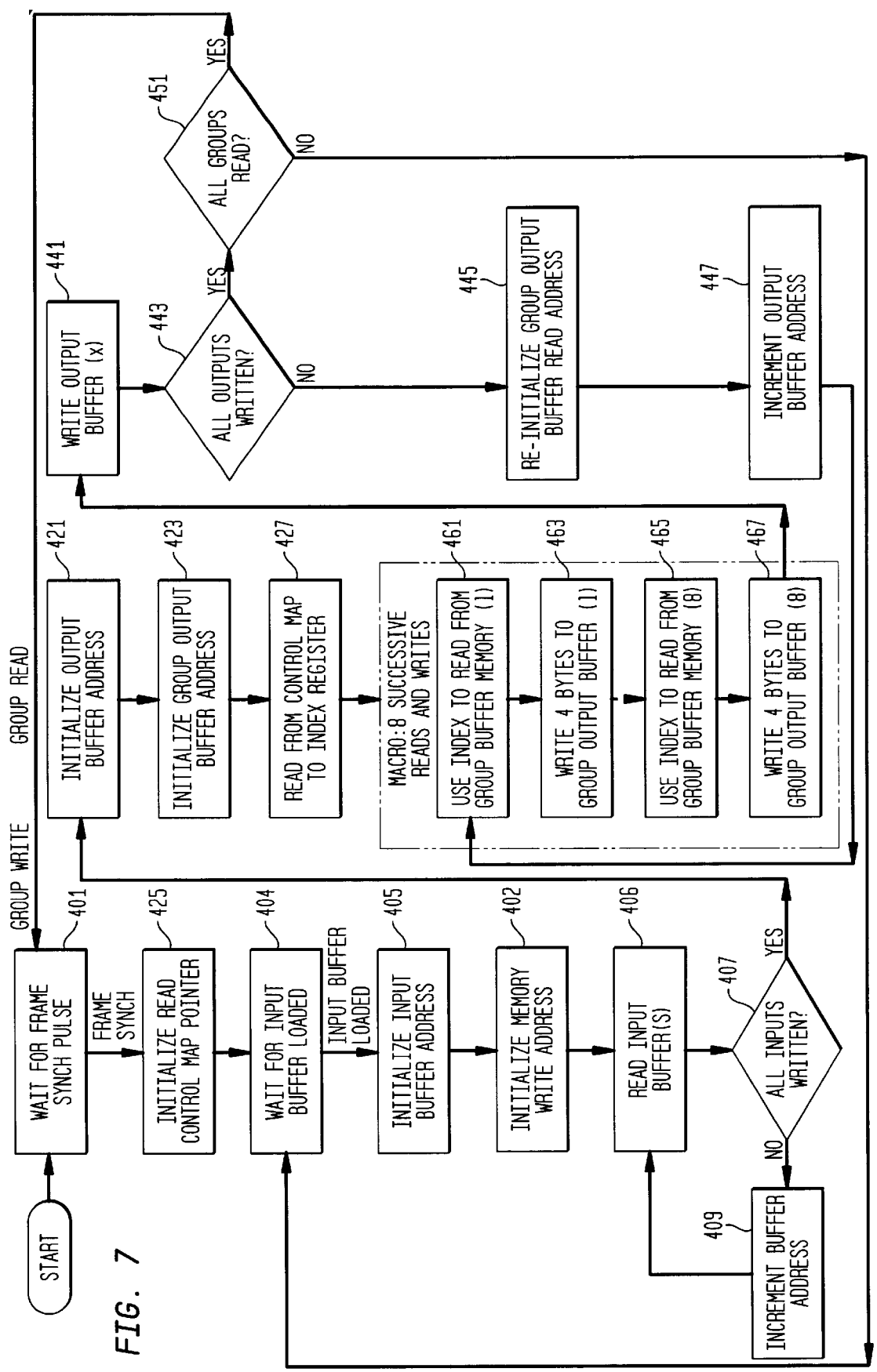
FIG. 7 shows the program for a TSI, wherein groups of time-slots are bundled and switched as a bundle.

FIG. 7 is a flow diagram illustrating the operation of the system when used for switching groups of time-slots at a time. This use would be for replacement of a digital cross-connect (XCON), such as the DACS (Digital Access And Cross-Connect System), systems manufactured by Lucent Technologies.

Blocks 461, 463, 465, and 467, replace the functions carried out by Blocks 429, 431, and 433, in FIG. 6. In the implementation described in FIG. 7, only Blocks 461 and 463 are repeated 8 times. In the final repetition, 465 and 467 are shown, but instead of using the loop, the program is written in-line. Action Block 461 is essentially equivalent to Action Block 429 of FIG. 6, and Action Block 463 is essentially equivalent to Action Block 431 of FIG. 6; however, instead of having a test of 433, the code is simply repeated 8 times prior to entering Action Block 441.

The above flow chart described an eight bit time-slot where a byte quantity is read and written in Action Blocks 429 and 431. Sixteen and 32 bit time-slots can easily be accommodated with a straightforward substitution of half word or full word microprocessor instructions, for the corresponding load and store byte instructions. The time-slot width can be further generalized to include group switching, where contiguous time-slots are switched as a group using load/store string instructions in Action Blocks 429 and 431, to transfer a sequence of time-slots. The total number of bytes of switched information per unit of time, increase with increasing time-slot width or group size, since the loop overhead of Action Blocks 427 through 433 is reduced proportionally relative to that of a byte wide time-slot. This is very efficient for switching a 32 time-slot PCM (E1) facility, for implementing a cross-connect. Some group sizes like that of a T1 facility of 24 byte wide groups, might be most efficiently switched by padding the 24 time-slots to a 32 byte group. Groups can be concatenated contiguously to form higher bandwidth rates, such as DS3 at the output of the output buffers; this is especially useful for performing the function of a digital access and cross-connect system.

Figure 8:
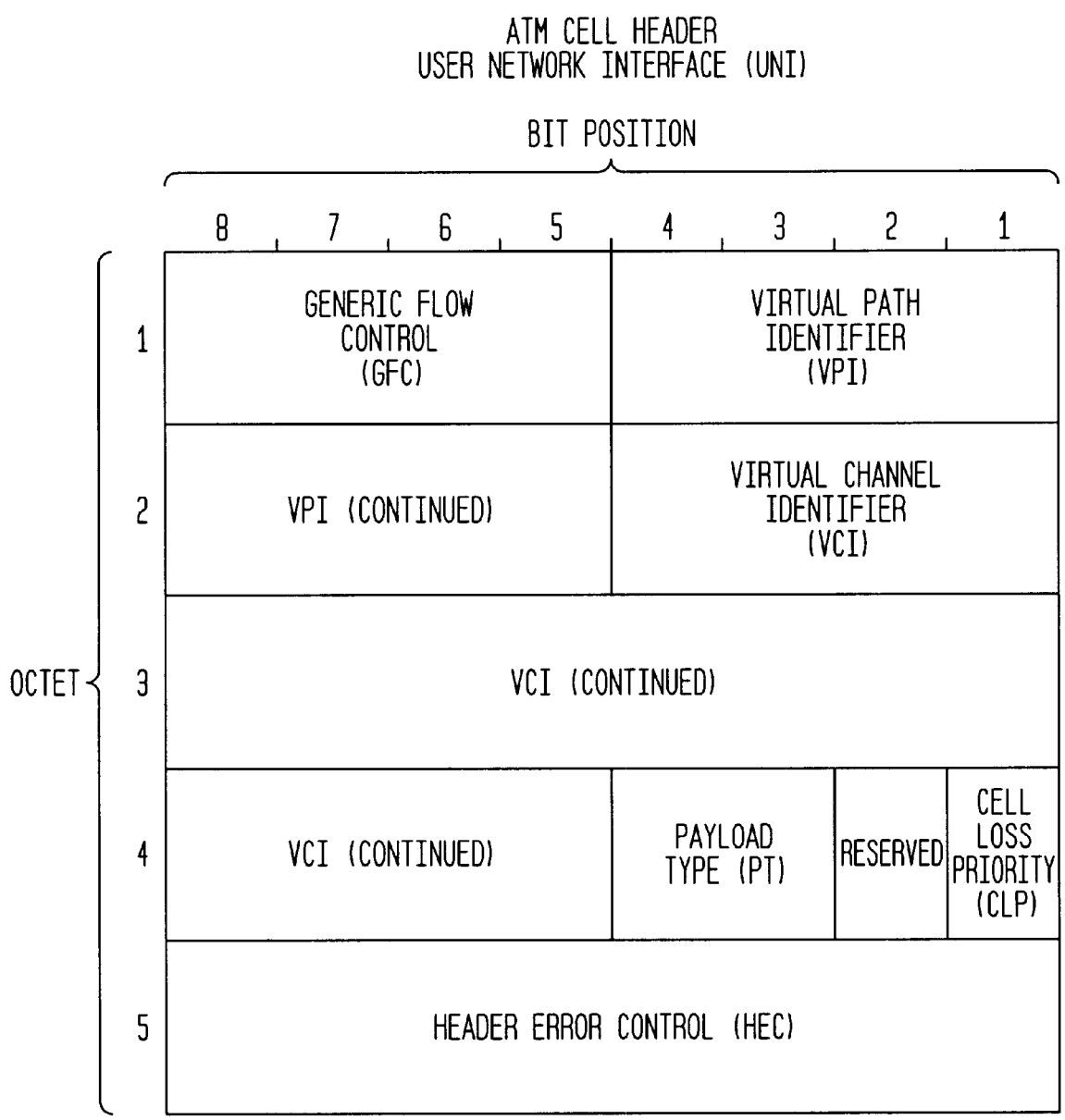
FIG. 8 illustrates a cell header for an asynchronous transport method, (ATM), cell header.

The block diagram of FIG. 1 can also be used to implement an ATM Switch. FIG. 8 shows the structure of an ATM cell header. The ATM cell might be most efficiently switched by padding the 53 time-slots into a 64 byte group. This requires some control logic in the Input Buffers and Output Buffers. The generic flow control bits 5–8 of octet 1 are used for overall control to prevent an ATM system from being overloaded. The virtual path identifier is split across the first four bits of the first octet, and the last four bits of the second octet. The virtual path identifier identifies a user. All virtual channels of the same user use the same virtual path identification. The virtual path identifier is the primary identifier used for switching ATM cells within a switch, and for identifying incoming ATM cells so that they can be switched to the appropriate destination. The virtual channel identifier, (the first four bits of octet 2, all of octet 3, and the last four bits of octet 4), is used by the user to identify a specific communication among a plurality of the communications between the end users; the specific communication resides on a specific channel. The first four bits of octet 4 are the payload type (2 bits), one bit reserved for future use, and a cell loss priority bit. The cell loss priority bit is used to help determine whether a particular cell may be discarded in case of overload. Finally, the header error control octet is a cyclic redundancy check (CRC) over the header.

Figure 9:
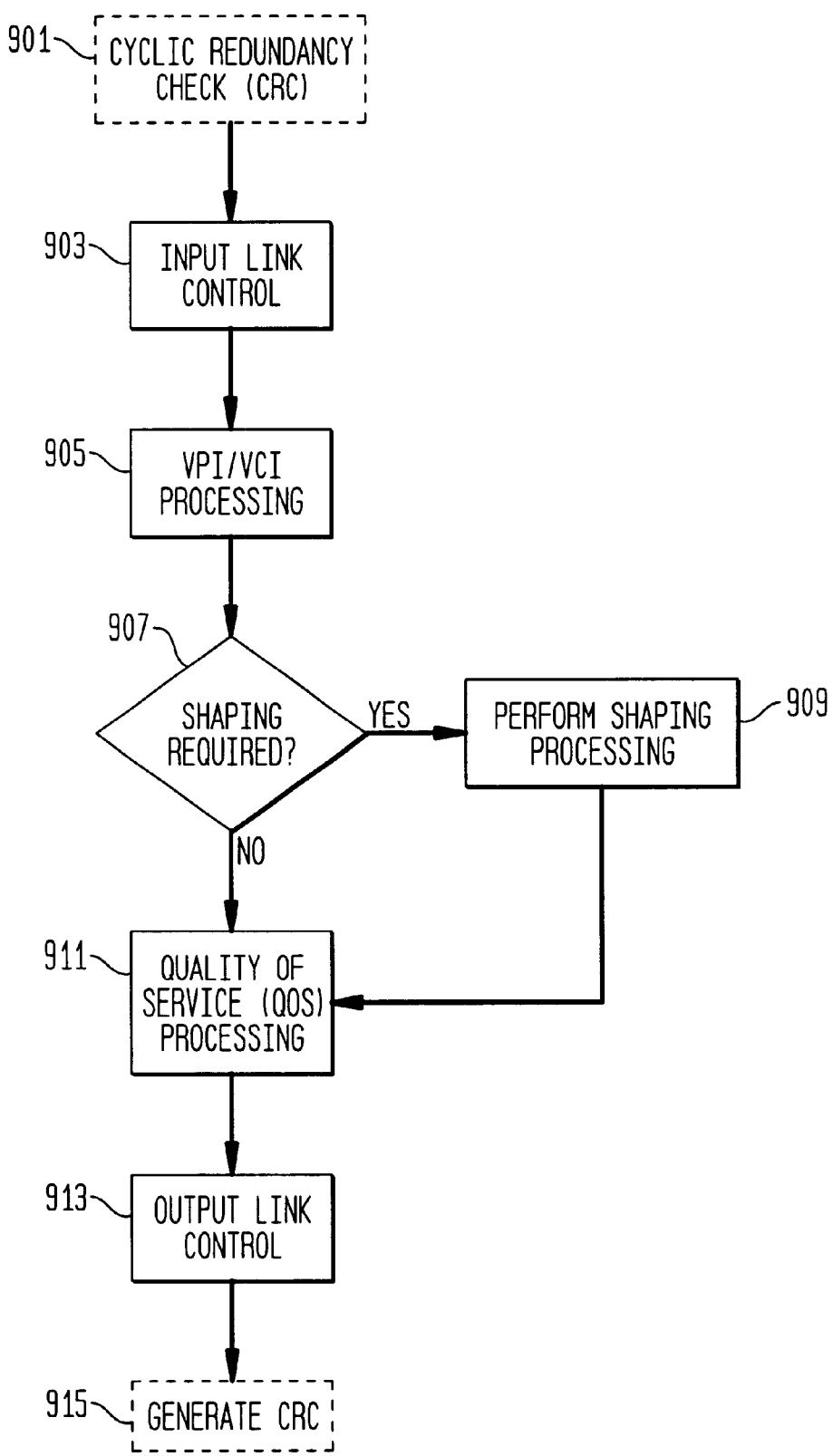
FIG. 9 illustrates the basic operation of the processing of an ATM cell.

FIG. 9 is a functional overview of the software control components of the ATM Switch. They consist of a CRC Check, Input Link Control, VPI/VCI Processing, Shaping, Quality of Service (QOS) Processing, Output Link Control, and CRC Generate. The cyclic redundancy check, (Action Block 901), is performed on the header of each ATM cell as it enters the system. Input link control, (Action Block 903), brings incoming data into the memory of the microprocessor. VPI/VCI processing, (Action Block 905), finds a VPI/VCI data block which contains an Input VPI/VCI indication, an Output VPI/VCI indication, and a Quality of Service, (QOS), pointer. Test 907 is used to determine whether a shaping test is necessary. Shaping tests are not performed on every cell, but typically, on every tenth cell. If this is a cell that requires the performance of the shaping function, this shaping function is executed, (Action Block 909). The shaping function determines whether the peak or the average allowed data rate is being exceeded. If so, the shaping function introduces a throttle to the transfer of information, which is regulated by putting packets into a shaping queue with limited size, so that if the peak rate is exceeded for too long a time, or the average rate is exceeded, there would no more space in the shaping queue, and the input would be throttled, or packets would be dropped.

Next, Quality of Service processing, (Action Block 911), is carried out. Each output link has a plurality of queues to provide cells to that output link. The queues contain information of different priority so that certain queues are served preferentially compared to other queues. Finally, the output link control, (Action Block 913), transmits cells from one of the QOS queues to an output link, and a new CRC is generated. Prior to inserting the cell into one of the QOS links, the output VPI/VCI is inserted into the cell header. For some implementations, the CRC functions can be done in hardware in order to increase the switching capacity of the ATM Switch.

Figure 10A:
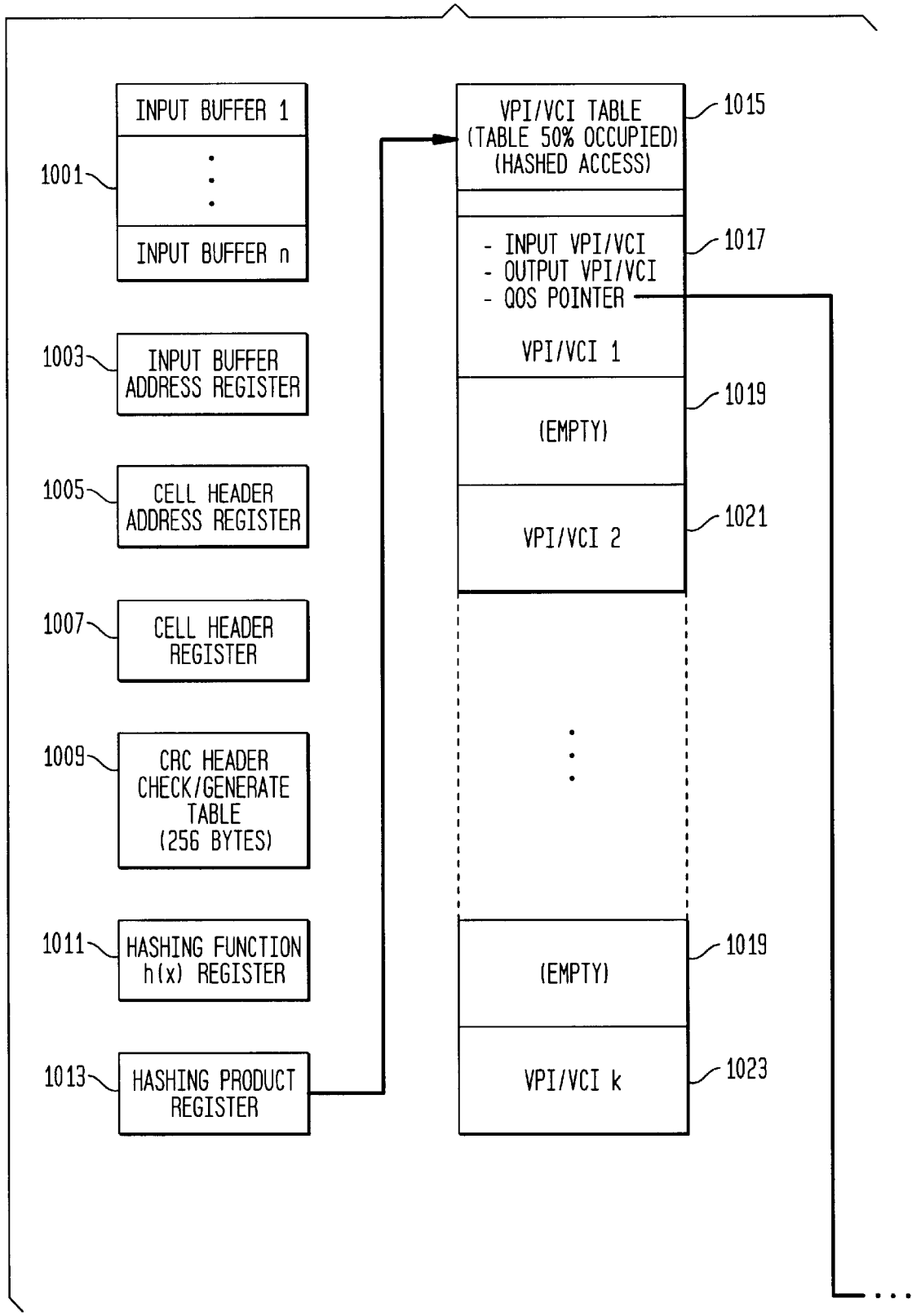
FIG. 10 is a programmer's module, illustrating the layout of memory for a microprocessor acting as a ATM switch.
Figure 10B:
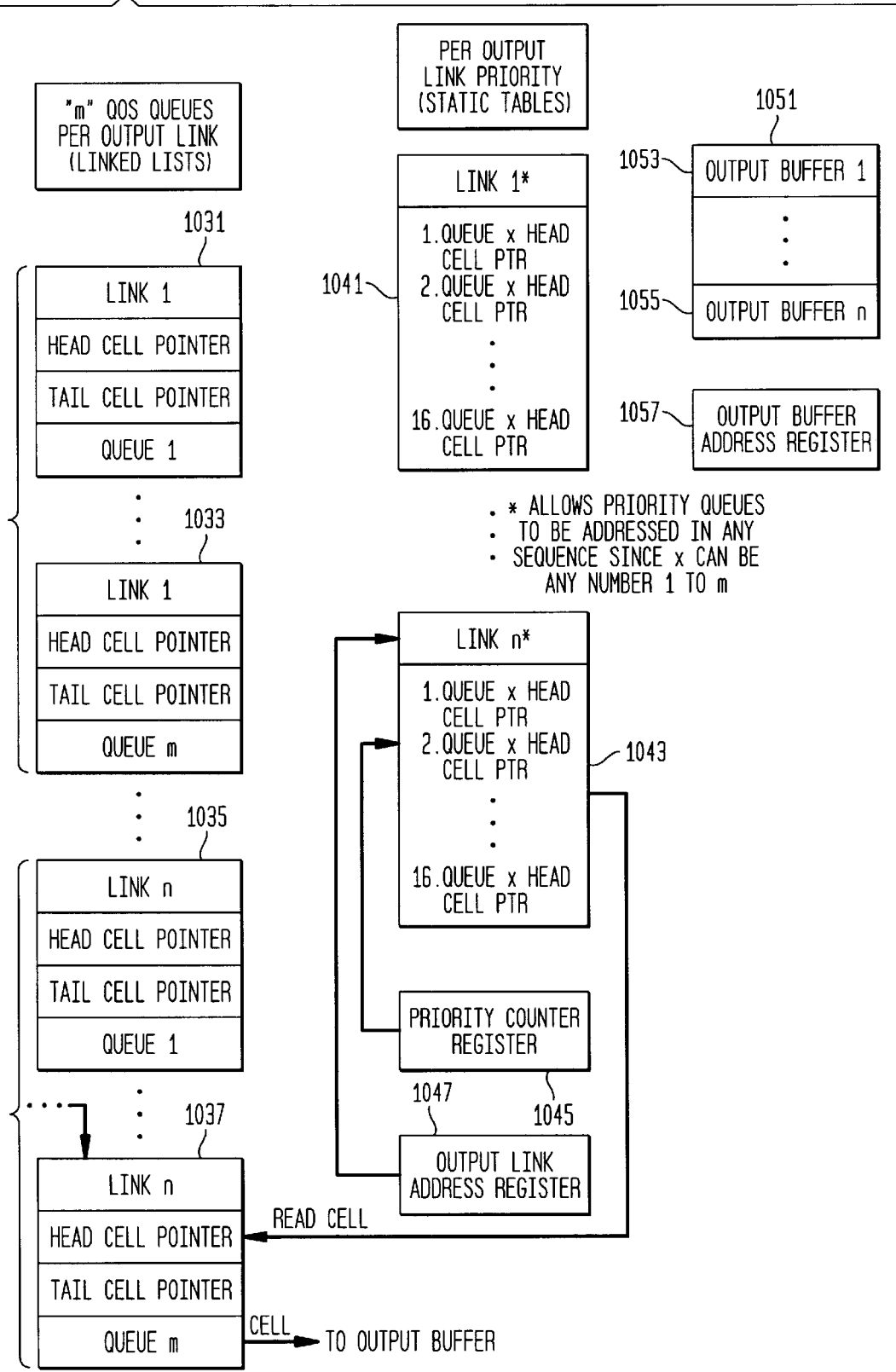

FIG. 10 shows the Programmers' Data Model including register assignments and the data structures used in the implementation. ATM cell routing, defined by the Virtual Path (VP), and Virtual Channel (VC), identifiers is implemented by table look-up in an off chip Static Random Access Memory (SRAM), or in a Level 2 cache, using a hashing algorithm. Queuing of cells is implemented by means of a shared buffer area in cache memory and linked lists associated with each of the output ports. There is also a linked list associated with the unused memory locations, which is used as a pool for adding members/locations to any of the linked lists. Each output link has multiple output queues, each of which is associated with a specific Quality Of Service (QOS). Each output link uses a table look-up of priority, to give the identity of the next QOS queue to be output. This allows the QOS queues to be accessed in any priority sequence desired.

While in this preferred embodiment, everything is in the cache, for other implementations, especially those with high throughput, much of the data, and some of the more specialized programs, can reside in an external memory.

The function of the various Blocks of FIG. 10 is as follows:

Block 1001 represents the input buffers to the switch.

The input buffer address register, 1003, determines which buffer the system is processing.

Cell header address register 1005, and cell header register 1007, are used for processing the header of one particular cell.

Block 1009 is used for checking and generating the header CRC, (in some alternate configurations, the CRC can be checked or generated automatically by circuitry).

Blocks 1011, the hashing function register, and 1013, the hashing product register, are used for locating the VPI/VCI specified in the header of an input cell.

Block 1015 is the VPI/VCI Table, which is typically occupied only 50 percent to allow for efficient hashed access.

Some of the blocks pointed to by Table 1015, are Block 1017, which is the VPI/VCI block for VPI/VCI 1, Blocks 1019, which are empty blocks, and Block 1023, the block for the last VPI/VCI.

Block 1017 includes the identity of the input VPI/VCI, the identity of the output VPI/VCI to which the cell should be switched, and a pointer to the Quality of Service, (QOS), queue which is used for assembling cells to be transmitted to the output link.

The third column of FIG. 10 shows a plurality of QOS queues, using a shared memory spectrum, one set 1031, . . . , 1033 for link 1, and another set, 1035, . . . , 1037, for the last link, Link "n". Block 1031 includes an identification of the link for which cells are being queued, and a pair of pointers for the entries in the queue. The entries in the queue are linked each to the next, and the head cell pointer is used to find the cell in the queue which is to be transmitted to the output link, and the tail cell pointer finds the entry in the queue in which the next cell can be entered. Finally, Blocks 1041 and 1043 are used for selecting the particular cell in one of the QOS queues which is to be transmitted to an output buffer. For each output buffer, there is one link control, such as link control 1043. Link control 1043 contains head cell pointers to the QOS queues. For high priority QOS queues, several entries would be made in the table of 1043, which has sixteen entries, with the sixteen entries being more than the typically 4, QOS queues per output buffer. The output link register is used to select which link is being processed, and the priority counter register is used to select the head cell pointer for that output buffer. When the head cell pointer of Block 1043 is read, it will point to a head cell pointer of one of the QOS queues, and that head cell pointer in turn, will point to the oldest cell in that queue, i.e., the cell which is to placed in the output buffer. Finally, Block 1051 shows the "n" output buffers, output buffer 1, 1053, . . . , output buffer "n", 1055. The output address register 1057 is used to select which output buffer is being processed.

Figure 11A:
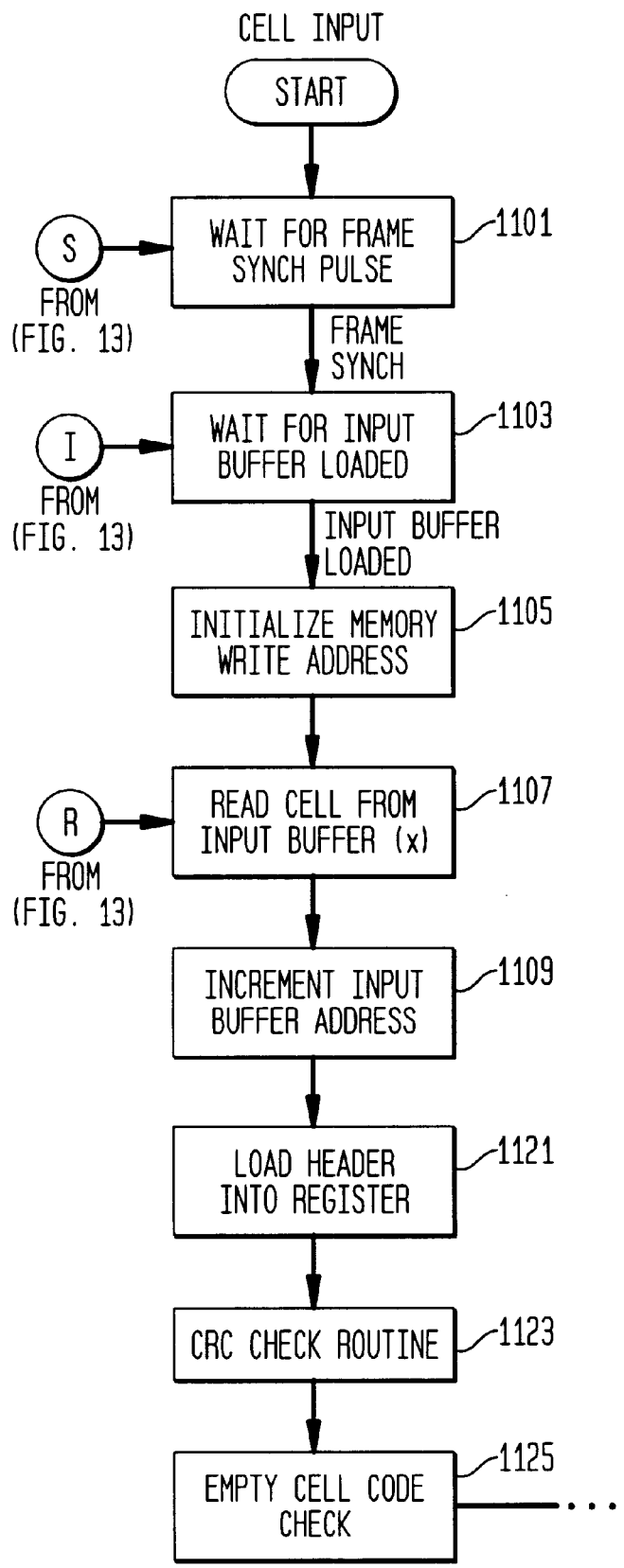
FIG. 11 is a flow diagram, illustrating the operation of the input processing of a microprocessor ATM switch.
Figure 11B:
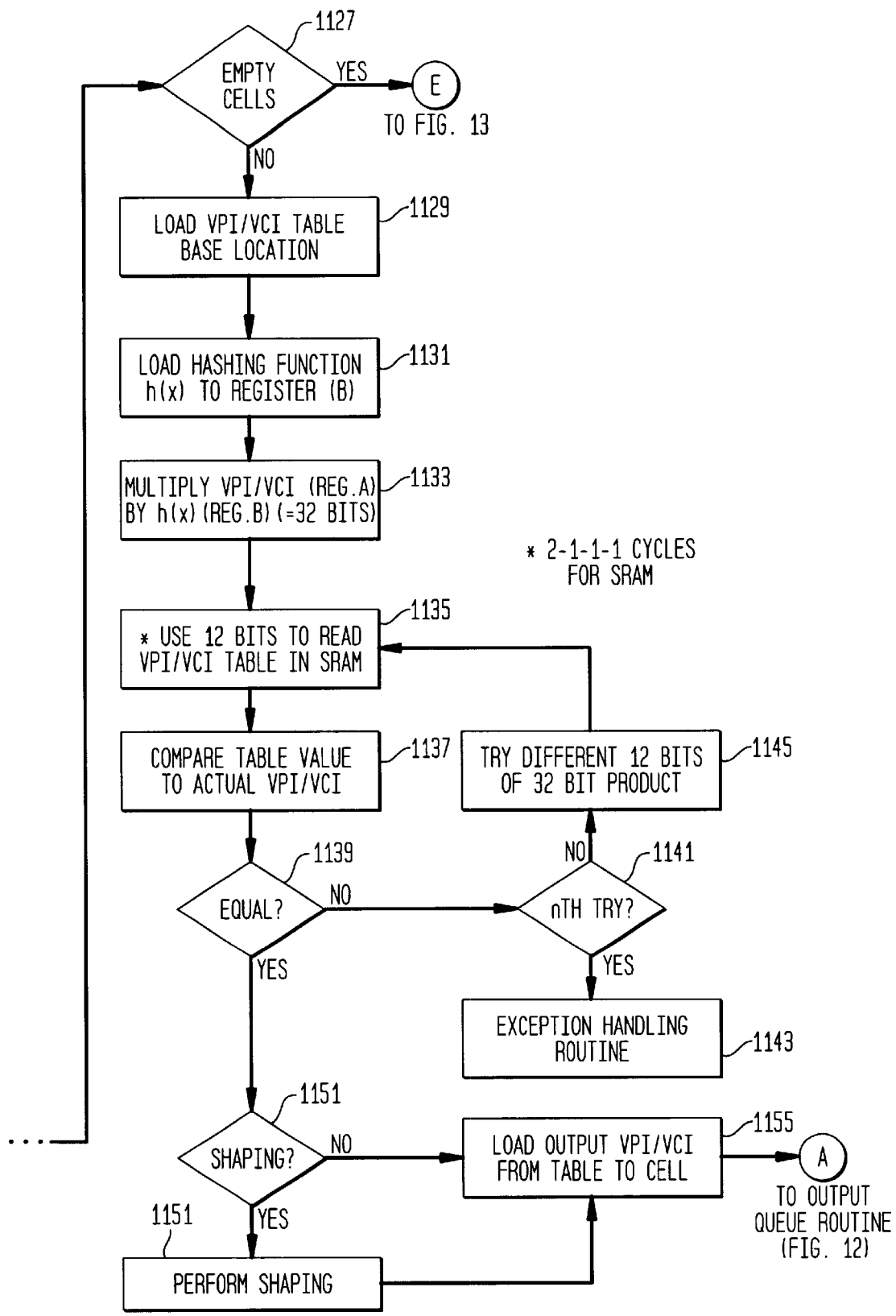

FIG. 11 is a flow chart showing the Cell Input and VPI/VCI Flow. The cell input section shows the writing of a burst of 32 bytes into the cache memory from the Input Buffer selected by the Input Buffer Address. The header and VPI/VCI Processing are shown in the remaining part of the figure. The CRC check can be done in software if desired, and is implemented by using the header, a byte at a time, for indexing into a 256 byte table. If an error is detected, a routine is entered which either corrects the error or results in the cell being dropped. After the CRC check, an Empty Cell Code Check is done. Empty cells are ignored, but the routine goes to the normal "single thread" output routine, ("E" input of FIG. 13). Next, a 32 bit hashing function is used in conjunction with the VPI/VCI, to generate a hashing address for indexing into SRAM or Level 2 cache, and read a 32 byte burst of data for that VPI/VCI. If the correct VPI/VCI is not at that address, alternative hashing addresses are iteratively tried until either the correct VPI/VCI is found, or the exception handling routine, is entered. Hashing algorithms are well described in the literature. For a VPI/VCI table which is only 50% occupied, the average number of searches required by the implemented algorithm is 1.5, thus, providing reasonable access times at the expense of memory. When the search is successfully completed, shaping is performed, if necessary, and the "Output VPI/VCI", i.e., the destination for the cell, is extracted from the table and inserted into the cell header.

Figure 12:
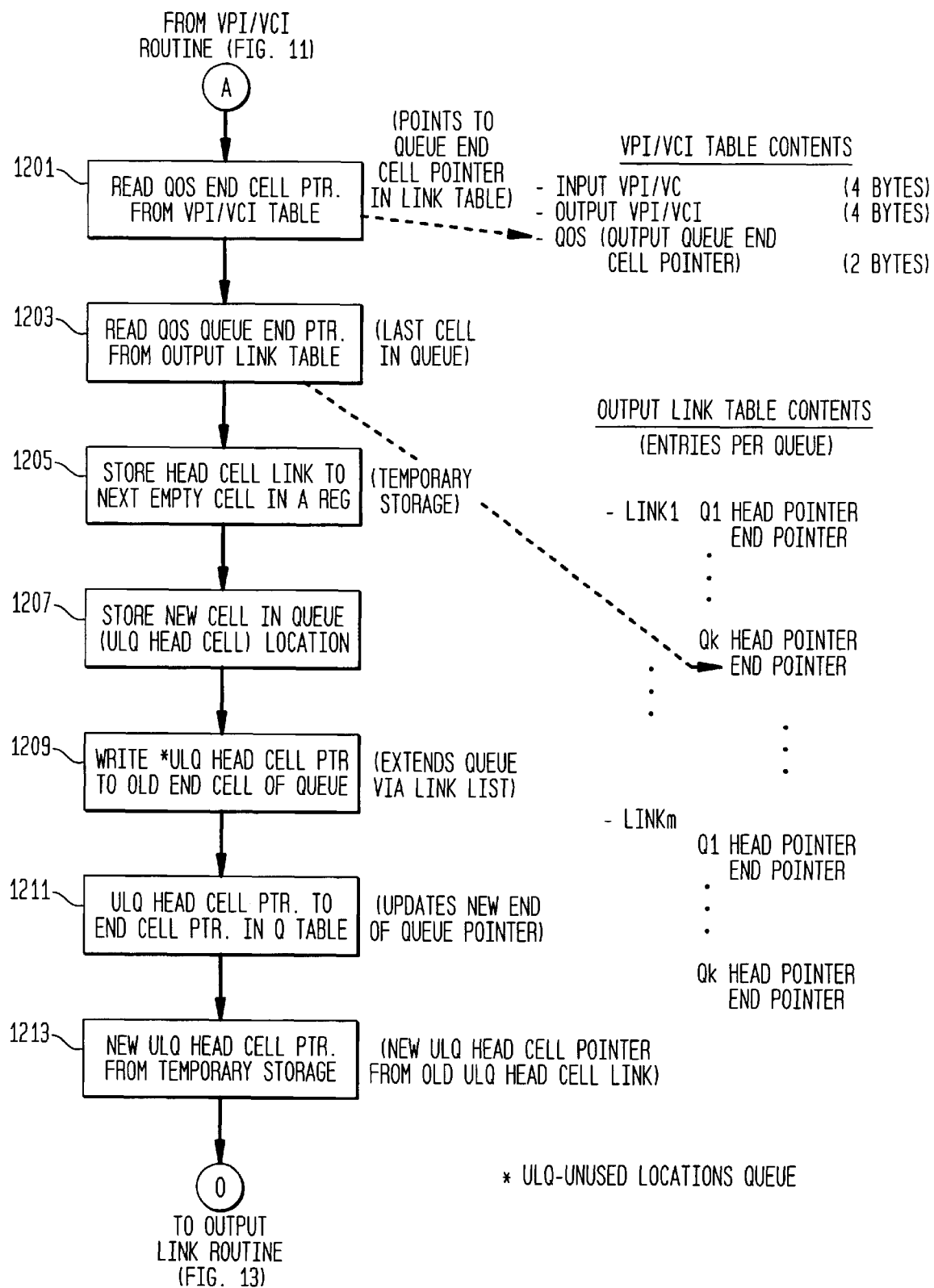
FIG. 12 illustrates the processing of the output queue of the microprocessor program for an ATM switch.

FIG. 12 is the Output Queue Flow Chart. It consists of inserting the cell into the appropriate output queue based on the output link, and the QOS specified in the data associated with the VPI/VCI search described in the previous paragraph. There are "m" QOS queues associated with each output link, and each queue is defined by a linked list, (see the "m" QOS Queues Per Output Link Tables in FIG. 10). Linked lists are well known in the prior art. There is also a list of all the unused memory locations defined by an unused locations link list, called an "Unused Location Queue", (ULQ). FIG. 12 details the pointer and data manipulation to implement the linked list queues.

Figure 13A:
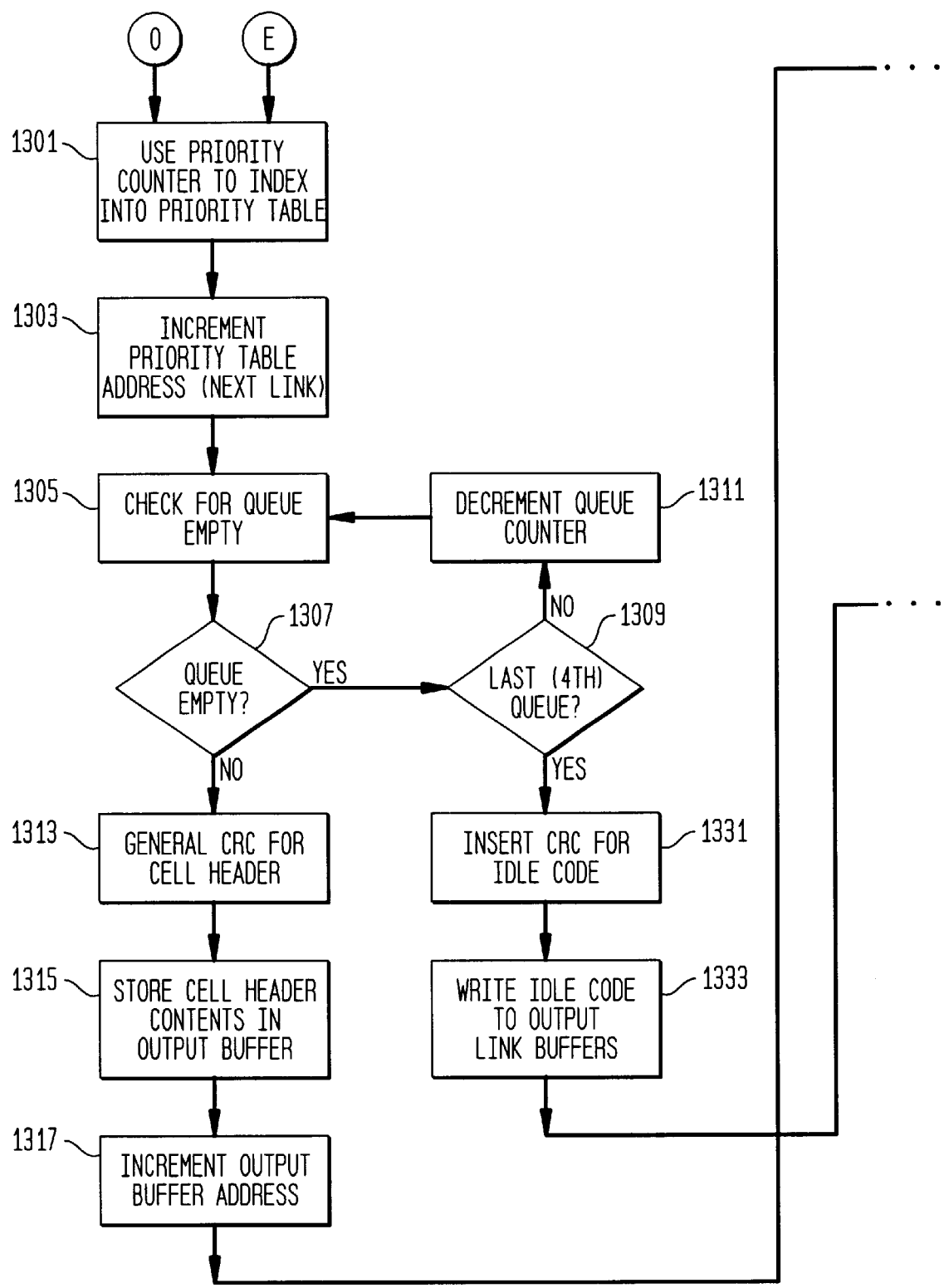
FIG. 13 illustrates the process of processing ATM cells to output links of a microprocessor ATM switch.
Figure 13B:
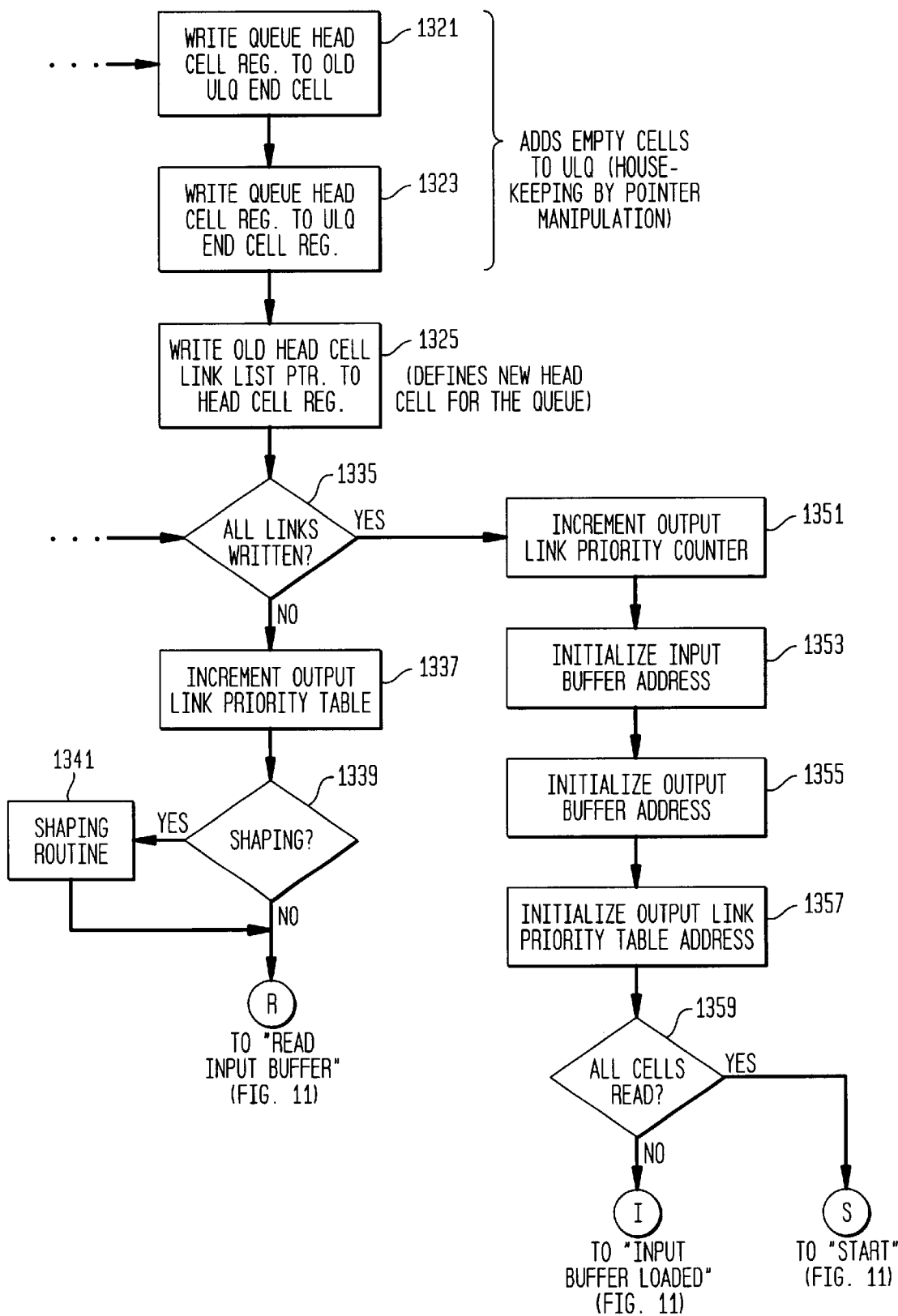

FIG. 13 is the Write to Output Links flow chart. The priority sequence used for the output queues is to use a static Per Output Link Priority Table, (see FIG. 10), to establish the sequence of queue readout on a per link basis. The Per Output Link Priority Tables shown in FIG. 10, show, (as an example), 16 entries, each of which could specify any of the "m", (e.g., m=4), queues established for that link. If the selected queue on a link is empty, each of the other queues are interrogated until a queue with data is found, or it is determined that all of the queues associated with the link are empty. If a cell is present in any of the queues, then the CRC is generated and inserted in the header and the cell is transferred to the output buffer. If there is no cell in any of the queues, then the CRC for Idle Code is generated, and an Idle Code cell is transferred to the output buffer. There is then some pointer manipulation associated with housekeeping of the linked lists. There is further housekeeping associated with priority and buffer address manipulation. There are also some decision points regarding All Links Written, Shaping, and All Cells Read resulting in appropriate loop back to entry points in FIG. 11, or transfer to the shaping routine.

Shaping, (Action Block 909), occurs at multiple, periodic cell intervals to assure that the per VPI/VCI contracted peak and average bandwidths are not being exceeded. Cells can either be dropped, delayed or passed through. Shaping is done on a per VPI/VCI basis using linked list auxiliary queues. The details for performing shaping are well known in the prior art. Additional information is stored in the VPI/VCI Table of FIG. 9. For the shaping interval being considered, (e.g., every 10 cells for peak rate, and every 100 cells for sustained rate), the following information is provided in the VPI/VCI table: contracted Peak Cell Rate, (PCR), time stamp for PCR, contracted Sustained Cell Rate, (SCR), time stamp for SCR, and maximum size of shaping queue.

The individual Blocks of FIGS. 11–13 will now be described. FIG. 11 starts in Block 1101, wherein the system is waiting for a frame synchronization pulse. When the frame synchronization pulse arrives, it signals the beginning of the synchronized loading of the input buffers 101, . . . , 102, (FIG. 1), in serial input streams. Action Block 1103 indicates a wait for the signal that input buffer has been loaded. When the input buffer has been loaded, the memory write address for unloading that buffer into microprocessor memory is initialized. The cell is then read from the input buffer, (Action Block 1107), and the input buffer address is incremented, (Action Block 1109). At this point, the cell has been loaded into the memory of the microprocessor, and the microprocessor is ready to process the cell. The header of the cell is loaded into a register, (Action Block 1121), and a CRC check is performed, (Action Block 1123). A CRC check is performed only on the contents of the header. A CRC check can be performed with special circuitry, or it can be performed relatively expeditiously through the use of a table of 256 bytes; each byte corresponding to one of the 256 possible CRC bytes. Next, a check is made to see if the cell is empty, (Test 1125). An empty cell has an industry standard predetermined VPI/VCI identification. Test 1127 determines whether the cell is in fact empty, and if so, further processing is terminated, and the output processing routine of FIG. 13 is entered. If the cell is not empty, then the VPI/VCI Table entry for this cell must be found. Action Blocks and Tests 1129, 1131, 1133, 1135, 1137, 1139, 1141, 1143, and 1145 describe this process. The VPI/VCI Table, (Table 1015), of FIG. 10 is found, (Action Block 1129). A hashing function, a known constant, is then loaded into a register of the microprocessor, (Action Block 1131). This register is then multiplied by the contents of a register containing the VPI/VCI, (Action Block 1133). In one example of this embodiment, there are up to approximately 2,000 VPI/VCI entries, such as Block 1017 of FIG. 10. In the Table, 12 bits of the product generated in Action Block 1133, the least significant 12 bits in this case, are then used to read an entry in the VPI/VCI Table. The Table is 4,096 entries long, and corresponds to the 12 bit accessing queue. In Action Block 1137, the actual VPI/VCI is compared with the VPI/VCI found in the accessed VPI/VCI Table, (Action Block 1137), if Test 1139 is used to determine if the two are equal. Equality means that the appropriate VPI/VCI Table entry has been found. If not, then Test 1141 is used to determine whether this is already the "nth try", and if so, the exception handling routine 1143 is entered. This routine searches a list of VPI/VCI Table entries, (not shown in an Auxiliary Table), used for serving cases in which "n" tries fail to locate a VPI/VCI. Entries in the Table are created in those cases where an attempt to load the Table, encounters "n" failures. If this is not the "nth try", then a different 12 bits of a 32-bit product generated in Action Block 1133 is used, (Action Block 1145), in order to access a different entry of the VPI/VCI Table, (Action Block 1135).

The hashing arrangement is used because the total number of possible VPI/VCI combinations is over a million, (the VPI indicator is 8 bits long, and the VCI indicator is 12 bits long), so that $2^{20}$, (more than one million), possible values of VPI/VCI exist even though only 2,000 are being used at any one time.

Once the appropriate VPI/VCI Table entry has been found, (with output of Test 1139), Test 1151 is used to determine whether shaping is required in this case. In this embodiment, shaping actions are performed only on every "nth" cell, wherein "n" may, for example, have a value of 10. Shaping is used to monitor the input rate of a particular VPI, to insure that the VPI does not send more cells than is allowed for its peak rate. The peak rate is defined as the number of cells which may be sent for a particular interval. If more than this number of cells is sent, then the extra cells are either simply discarded, or are temporarily passed on, but a slow-down message is sent to the source of the cells. After the shaping function has been performed, (Action Block 1153), or in case shaping is not required for this cell, then the output VPI/VCI identifier is loaded from the VPI/VCI Table into the cell and is substituted for the input VPI/VCI. Thereafter, the output queue routine of FIG. 12 is entered.

The system reads the QOS pointer stored in the VPI/VCI Block. This pointer points to a tail cell pointer within the QOS queue for serving that VPI/VCI. The QOS queue, (for example, Block 1037 of FIG. 10), is used to queue cells for transmission to an output link. As previously mentioned, several QOS queues serve a particular output link and depending on the quality of service being supplied to a particular VPI/VCI, the cells are stored in a different queue, and different QOS queues are served preferentially, for delivering their contents to an output link. The contents within each QOS queue are stored in a linked fashion, and the last entry is pointed to by a tail cell pointer. It is this pointer which is pointed to by the QOS pointer in the VPI/VCI Block. The QOS queue "m" pointer is read, (Action Block 1203), and a "n" link from that idle queue location to the next idle queue location, is temporarily stored in a register of the microprocessor, (Action Block 1205). The cell is then stored in the queue at the location originally specified by the "n" cell pointer, (Action Block 1207), and the address of the next empty cell.

In order to share the available memory space effectively and dynamically, linked lists are used for each of the output queues. In addition, there is an "unused location" linked list, which is a global resource containing the empty, (unused), locations available for storing information in queues. When a queue needs to add information, it gets the available location from the "unused location" linked list. As a result, both the "unused location" linked list, and the linked list of the queue requesting an available location, are impacted. There is a separate head cell pointer, and tail cell pointer associated with every queue, including the Unused Location Queue, (ULQ).

The head cell of the ULQ is the next available location for storing a queued cell, and the tail cell of the ULQ is the last cell that has been returned to the ULQ pool. The head cell of a queue is the last cell that has been stored in that queue, and the tail cell of a queue is the next cell to be out-putted from that queue. The head cell of the ULQ becomes the tail cell of the queue that is requesting a storage location, and the linked lists of both are modified to support this transfer of memory location function. Specifically, Action Block 1204 extends the queue to include the cell stored by Action Block 1207, and Action Block 1211 updates the pointer to reflect this linked list extension. Action Block 1213 changes the head cell pointer of the ULQ to reflect the removal of an available cell location.

Following the execution of Action Block 1213, the output processing of FIG. 13 is performed. Block 1043 of FIG. 10, is a series of 16 pointers to the "m" QOS queues of a particular output link, where "m", in this example, is much less than 16, typically 4, so that the 16 entries can be used to service different QOS queues more, or less, frequently. Associated with an output queue is a priority counter 1045, which is used to select the appropriate entry from the priority table. In Action Block 1301, the priority counter is used to index into the priority table of the output link being serviced, (different output links are serviced on a rotating schedule). The priority counter is then incremented in order to prepare for servicing the link the next time, (Action Block 1303).

The queue pointed to by the priority table, is then checked to see if it is empty, (Action Block 1305). Test 1307 is used to determine whether the queue is empty, and if so, whether this is the last, (4th), queue, (Action Block 1309). If it is not, then the queue counter is decremented, (Action Block 1311), and the corresponding queue is checked to see if it is empty, (Action Block 1305). If the result of Test 1307, either initially, or after having gone through the loop, using 1309, 1311, and 1305, indicates that the queue is not empty, then a CRC is generated for the cell header, (Action Block 1313), and the cell header is stored in the output buffer, (Action Block 1315). The output buffer address is incremented to prepare for subsequent processing, (Action Block 1317), and the queue this cell was transferred to the output buffer, is updated to add the storage of the cell which was transferred to the buffer to the list of empty locations in the queue, and to update the head cell for the queue.

Action Blocks 1321 to 1325 represent link list pointer manipulation for reading from a queue to the output link, and is similar to the write sequence for Action Blocks 1204, 1211, and 1213, described above. In this case, however, a cell location is added to the ULQ pool, and a cell location is removed from the queue that has out-putted a cell.

Test 1335 is then used to determine whether outputs to all links have been sent. If not, the output link priority table is incremented, (Action Block 1337), so that at the next pass, the next link will be served. Action Blocks 1339 and 1341 are used to unload the shaping queue. In the case that outputs to all links have been generated, (positive result of Test 1335), then the output link priority counter is incremented, 1351, the input buffer address is initialized, (Action Block 1353), so that the first input buffer is then serviced, the output buffer address is initialized, (Action Block 1355), so that at the next pass, the initial output buffer will be serviced, and the output link address register is initialized (Action Block 1357). Test 1359 then determines whether all cell have been read from the input buffers, and if not, Action Block 1103 of FIG. 11, is re-entered. If all cells have been read, then Action Block 1101 of FIG. 11 is entered.

FIGS. 11 to 13 show the flow charts for implementing an ATM switch, exclusive of the shaping, (which occurs only at multiple cell intervals to assure that the per VPI/VCI contracted peak and average bandwidths are not being exceeded). The flow chart deliberately shows a "single thread" implementation, i.e., one cell at a time is taken from input to output before the next cell is input in order to demonstrate the logic of the design. Efficiencies in processor utilization can be obtained by overlapping functions such as I/O read/writes, and read/writes of off chip memory and Level 2 caches, by doing "multiple thread" ATM cell processing.

The above implementation of ATM switching assumed that the ATM cells coming into the switch were in the format of 53 contiguous time-slots, which characterizes an important segment of the applications. There are other applications where an ATM cell comes in over lower bandwidth pipes, e.g., fractional T1 /E1 using 128 Kbps, 384 Kbps, etc. For those cases, the ATM cell needs to be aggregated by examining a number of frames until the entire 53 byte cell is available. There are several ways to implement this. One way is to consider this function as part of the periphery, and provide a separate RISC microprocessor to provide the function. A second way, is to incorporate the aggregation function into the ATM switching fabric discussed above. Different tradeoffs will exist for different applications, e.g., the ratio of fractional ATM to complete cell ATM, as well of the size of the switching job being considered and the amount of real time available.

The block diagram of FIG. 1 can be used to implement an Internet Protocol, (IP) switch, as well as an ATM switch, whose functionality is described in FIGS. 9–13. Unlike the ATM case, an IP packet is of variable length, and has a destination address field that requires a longest prefix match for switching. The variable length implies more flexible buffer allocation schemes, and potentially, requires packet fragmentation and reassembly, depending upon the maximum transmission unit sizes in the different networks that the IP switch would switch between. The sequence of processing steps can be similar to the ATM case, and would consist of header checksum verification, input link control, destination processing, quality of service processing, output link control, and header checksum verification. In some implementations, the header checksum processing could be done in hardware in order to improve the capacity of the IP switch.

After IP header checksum verification, IP packet routing examines the destination address field of the IP header, and performs a hash based look-up algorithm that can search for a longest prefix match as is well described in the literature. The search would return information about the appropriate output link. Further analysis of the packet header could yield treatment information for implementing various levels of quality of service, and would locate a specific output queue associated with the output link and the assigned treatment quality. If the packet length is larger than the maximum transmission unit size of the output link, then the packet would be fragmented and linked to the appropriate output queue as a sequence of packets. Output link processing would select a packet from the highest priority queue of the moment, and perform final adjustments to the selected IP header such as adjusting the time to live field and the header checksum of the modified IP header before committing the packet to the actual physical output link. A time to live field is used to discard an Internet packet if it is not delivered within the time, or the number of switching points traversed, specified in the field.

IP, (Internet Protocol), switching can be performed within an universal switching fabric via software emulation of functionality, that would in less flexible implementations, be performed in hardware, often in Field Programmable Gate Array, (FPGA) based state machines. In all implementations, well formed packets are eventually handed to switching and routing software. The headers of these packets would be examined for classification as to flow types via hashing to determine output queues. The flow classification could use various protocol and port data from the packet to be switched in addition to the IP destination, in forming keys to the hashing process. The hashing search ultimately yields output link and queue information allowing for, (Quality of Service), QOS treatment. Various IP fields such as (Time to Live), TTL, would be updated as the packet was linked to output queuing. The routing information embodied in the flow based hashed search table, would be maintained through gateway protocol processing. Output handling would on a per link basis, always determine the next best output queue, to unlink a packet from for actual packet transmission. As is described in the above packet formation case, the packet output case could also be embodied in several different implementations. IP switching uses many of the mechanisms described in more detail in the ATM section. Depending upon performance trade-offs, different embodiments of these concepts can move the functionality of packet formation from serial streams; various separate sequentially cooperating processors can be used instead of a single processor to form packets from within TSI time-slot locations marked as containing packet stream data.

Frame relay switching can also be implemented within a software based universal switching fabric. In the frame relay case, HDLC based processing would be best performed by input adaption hardware, because the bit oriented processing would often not be cost effective in universal switch software. Assuming that well formed frames were handed to the frame switching software, hash searching over DLCI field information would yield out-put link and queue information. Separate Operations, Administration and Maintenance, (OA&M) software would maintain the frame routing information embodied in the frame hash route table. Subsequent output processing would unlink the frame from its output queue for transmission within an HDLC format by output adaption hardware.

So far, this document has described examples of single function switching fabric implementations which can reside on, and be implemented by a common RISC microprocessor architecture. These single function switching fabrics can reside, and be implemented concurrently on the same microprocessor.

In its simplest form, the different type of fabric functionality can be allocated on a per serial link interface to the shift registers shown in FIG. 1. This would be done under the control of software than can be downloaded, as required. For each type of link, the program for processing the protocol of that link is executed when processing that link. For example, if ATM time-slots and circuit switched time-slots destined for TSI functionality occupied separate serial link interfaces, the link time-slots would be burst into the cache as described in the single function implementations. The bandwidth of these serial links, e.g., number of time-slots, could vary depending on the application and the specific serial link. Since TSI time-slots must be retained for one or two frame intervals, (depending on whether the time-slots are single buffered or double buffered), reading in of subsequent ATM cells which do not have this frame retention requirement, could result in the corruption of the TSI data in the cache. If cache lines are locked after each input burst until the data is no longer required, then this potential problem is avoided.

This can be extended to more than two concurrent fabric types, including positional switching, (e.g., TSI, TMS, and XCON), and packet switching, (e.g., ATM, IP routing, and Frame Relay). Allocation to individual serial links may be unnecessarily restrictive, for many applications and the different types of traffic can reside on the same serial link with specific chunks of bandwidth being allocated for each protocol type, for switching data being transmitted in different protocols. This could also be done by downloading the appropriate data or software. This could be done using a "recent change" mechanism, as customers select or change their service type.

In the descriptions for TSI interfaces, the description indicated that the 24 bytes could be padded to 32 bytes in the input/output shift registers. Similarly, for ATM interfaces, it was suggested that the 53 byte cell could be padded to 64 bytes in the input/output shift registers. Although this is reasonable to do when only a single functional type is allocated to a shift register, it may add too much complexity when multiple functional types are allocated to a specific shift register. Thus, it may be preferable to read, (burst in), or write, (burst out), the links to/from cache as they are, i.e., a contiguous stream of time-slots, and do the padding manipulation in software, inside the microprocessor.

Bandwidth allocated for different traffic types within a given serial link could be flexibly manipulated by the subject microprocessor, with a linked list of data structures being used to describe sequential memory bytes from each serial interface. Separate input and output lists for each interface could be interpreted by the microprocessor with descriptive codes indicating the traffic type, with length information and application specific points and indicators that could, for instance, indicate where circuit switched data belong within a TSI, or where packet data would be buffered, for reassembly. The switch retains control data for a frame.

For example, the microprocessor might interpret from the linked data structures for a given interface, that the next M bytes of data should be treated as circuit switched data to be sent to the next M sequential locations of a TSI. The next linked data structure might then contain a code and length indicating that the next N bytes contain a part of an IP packet that is being assembled at the reassembly area, pointed to from the data structure. Finally, for example, the last linked data structure might indicate that the next P sequential bytes contain ATM cells.

Such a linked list of input and output descriptor data structures could flexibly describe any variety of traffic types within input and output interfaces. The descriptors could also indicate how data should be interpreted within distinct virtual tributaries of the same physical interface. OA&M software would be used to maintain the contents of the descriptor data structures.

Advantageously, these concepts can be used, for example, within a single microprocessor universal switch application at a small business, where in the prior art, the small business would lease separate fractional T1 facilities, with one T1 facility for PCM circuit switched voice traffic, another for frame relay based IP world wide web traffic, and yet a third T1 facility, for ATM based video conferencing. The leased cost of these separate facilities would often be substantially more than the cost of a single facility, even when more bandwidth would be available if a universal switching element could be used. The universal switching element can also, advantageously, offer the dynamic adjustment of bandwidth between different traffic types within the consolidated leased T1 facility.

The result of putting multiple concurrently running switching fabrics in a single microprocessor, is to have a minor impact on the capacity of the switches because of the real time impacts described above. It is estimated that a 300 MHz EC 603e PowerPC can support about 480 Mb/sec, (7500 time-slots), of single time-slot TSI switching, or about 1.5 Gbit of ATM cell switching, (3 million cells per second). When sharing functionality on a single microprocessor, the capacity of each of the applications is reduced by the proportional amount of their real time usage. For example, a single microprocessor could concurrently support about 240 Mb/sec, (3750 time-slots), of TSI, and 750 Mb/sec of ATM cell switching, (750,000 cells per second). The ratios for a particular application would depend on the traffic mix, and could include proportional amounts of Frame Relay and IP router switching.

The above sections have demonstrated concurrent operation of circuit switching and packet switching fabrics. The RISC can also provide the SAC function required to go between the circuit and the packet worlds such as AAL1, AAL2, and AAL5, as well as the layering of IP over ATM, and IP over frame relay. Thus, not only is there connectivity within the each of the switching domains, but also integrated interconnectivity between these switching domains.

FIG. 14 illustrates an arrangement for increasing the size of the TSI of FIG. 1. FIG. 14 shows an implementation that can be applied to any number n of input signals, any number k of microprocessor complexes, and any number n/k, that can be accommodated by the speed and memory capacity of these complexes. In the specific embodiment of FIG. 14, n is 32, k is 8, and n/k is 4. Each of the input streams terminated at the buffer amplifiers 521-1, . . . , 521-32, is connected to a shift register input buffer similar to the input buffer 101. For microprocessor complex 501-1, shift registers 511-1, . . . , 511-32, are connected to local bus 541-1, from which microprocessor complex 501-1 accept inputs. The same arrangement is available for each of the 7 other microprocessor complexes 501-2, . . . , 501-8. Each microprocessor complex feeds only four of the total 32 output buffers. For example, microprocessor complex 501, feeds output buffers 531-1, . . . , 531-4. The capacity of each microprocessor complex must be adequate to take inputs from the full range of input shift registers, but need only drive 1 over k of the output streams. Fortunately, the absorption of the inputs is done in parallel, since input signals are loaded into sequential locations in the TSI buffer 301, 303, of each microprocessor. Thus, very large amounts of input data can be absorbed per unit time in the microprocessor caches. It is only the output data which requires sequential time-slot by time-slot, or group by group, processing by the microprocessor.

The arrangement of local shift registers per microprocessor complex has the advantage of limiting high bandwidth connections to the nearby locality of each microprocessor, with the corresponding disadvantage of requiring replicated shift registers for each microprocessor. In another arrangement that might sometimes be advantageous, a single global set of shift registers could be used, with each microprocessor in lockstep, absorbing the same input data at the same time. In this case, the complexity of high bandwidth global connections and global microprocessor synchronization, would be traded against the savings of a set of shift registers for all but one of the microprocessors.

Theoretically, it is possible to take input data and process the input data serially in order to generate pre-ordered output data. The arrangement of FIG. 14 does not work satisfactorily for that kind of arrangement, (processing inputs serially to generate parallel outputs), because for each input word that is received in parallel, different microprocessors are required to do different amounts of processing, since each processor may process a different number of bytes to generate output streams for its outputs.

FIG. 15 shows a 3 stage Clos Network of switching microprocessors. The attribute of this type of network is that it requires the minimum number of time-slots, ("crosspoints" in earlier technologies), to provide a non-blocking network. For "n" inputs to the Input Microprocessors in FIG. 14, 2n−1 outputs are required for non-blocking. For large number of time-slots, 2n is a very close approximation, and errs on the conservative side. Consider FIG. 15 for a large TSI implementation. The input and output microprocessors have symmetrical capabilities. The total capacity of this TSI is "k" times that of a single microprocessor. There is a Control RISC Microprocessor that receives control messages from an external source, which has defined the end point time-slot connections required. The Control Microprocessor figures out the appropriate paths through the Clos Network, and dispatches appropriate control messages to each of the microprocessors requiring this information. This is done only once for each call. Each of the Input Microprocessors needs to assemble links of time-slots to send over to the appropriate Output Microprocessor. The Output Microprocessor receives the data from the center stage and makes the appropriate output connection to complete the path. The "j" center stages provide a space switch path between Input and Output Microprocessors, and switches an assembled group of time-slots to its proper destination. Thus, the center stages are providing "group switching" as defined earlier in this document, and it has been shown also in this document that there is more than a 5 times increase in the number of time-slots switched for a "group switching" microprocessor, compared to a single time-slot switching. Thus, the center stages "1" through "j" each have 5 times the capacity as one of "k" I/O processors. The center stage needs to handle twice the number of time-slots, ("2n") as the I/O stages, ("n") per processors, but as shown above, has 5 times the capacity. The number of center stages required is j=2(n/s)k, where n/s=1/5 is the ratio of the processing capacity of a "k" stage, TSI relative to a "j" stage group switching, and "k" is the number of input or output stages rounded up to the next integer. For example, for "k"=5, j=2(1/5)5=2. Thus, for a TSI 5 times the size of a single processor TSI, a total of 5 input, 5 output and 2 center stage processors are needed for a total of 12 microprocessors for 5 times the capacity, or 25,000 time-slots using the benchmark 200 MHz PowerPC.

FIG. 15 can also be used for packet switching, e.g., ATM. In the case of ATM, much of the real time is involved in VPI/VCI Table look-up, and QOS queuing and priorities. These functions can be shared between Input and Output microprocessors of FIG. 15 in a functional distributed manner. Thus, about twice the ATM switching capacity can be provided by means of using both input and output microprocessors for different functions. The center stage pure connectivity bandwidth, however, matches the bandwidth needs of the I/O pretty closely. Thus, for 5 input stages and 5 output stages, 5 center stages are required. The capacity of this network is, however, about 10 times that of a single ATM microprocessor because of the functional distribution. Thus, 15 microprocessors provide 10 times the capacity or a 10 Gbps ATM switch, for the benchmark 200 Mhz PowerPC. Proportionally, higher bandwidths can be obtained with higher performance PowerPCs.

FIG. 16 shows a three stage network which uses an ASIC or FPGA to implement the center stage as a crossbar switch, (circuit switched). This may be more cost effective for larger configurations, at the expense of the lead time necessary to get the ASIC or FPGA.

FIGS. 15 and 16 show a three-stage network for getting from input to output. There is an architecture where the network shown in these figures constitute a single entity of a larger interconnected configuration, comprising a plurality of entities, connecting to a global center stage for interconnecting the entities. For such a configuration, the center stage of FIG. 15 or FIG. 16, can be connected directly to the global center stage. Thus, multiple subsstantiations of FIG. 15 or FIG. 16, can be interconnected via this global center stage. These center stages, in conjunction with the global center stage constitute a three-stage configuration for the new center stage. The input and output microprocessors implement the same functionality as in FIG. 15 and FIG. 16.

Just as for a single microprocessor, multiple or single function switching fabrics can reside, and be implemented concurrently on the same microprocessor.

Although the discussion thus far has focused on "switching fabrics", the RISC microprocessor can be used to implement other functionality.

A RISC microprocessor can also be used to terminate serial telecommunications links. As an example, a proprietary PCT, (Peripheral Control and Timing) link can be considered. This serial fiber optic link has a 1024 time-slots, 768 of which are used for data transport, and the remainder for control, synchronization, and other functions. Frame synchronization is established by a fixed code established in several contiguous time-slots. Just as for the switching fabric, the serial bit stream is shifted into an external register, then burst into the cache as bytes of information. The RISC examines the contiguous byte sequence to see if it corresponds to the synchronization code. If not, then a single bit shift instruction is implemented and the resulting, changed contiguous bytes are examined. This procedure of examining the input bit stream for the correct code as subsequent bytes are entered via the I/O, continues until the synchronization code found. This establishes the frame synchronization point, and puts the serial link into synchronization. An additional byte in the sequence establishes the super-frame boundary, which is searched for until super-frame synchronization is also attained. Other required functions can similarly be implemented by appropriate operations on the bit stream. Multiple links can be supported on a single microprocessor. Other serial telecommunications links can also be implemented including the well-known standard DS1, DS3, DSn, E1, E3, and other 32 channel based facilities, SONET, SDH, as well as proprietary serial links such as the PCT, NCT (Network Control and Timing), PIDB (Peripheral Interface Data Bus), etc., used by the 5ESS® Switch.

One protocol can be used for transmitting data in another protocol. For example, the frame relay protocol, or the ATM protocol can be used for transmitting data in the IP protocol. The switching system can then switch data in the carrying protocol, and the carried protocol data can then be extracted from the switched data.

A specific microprocessor can be used to terminate either one type of the serial links or several types of these serial links concurrently. The multiple microprocessor configurations shown in FIGS. 14 and 15, can also be also be used.

The above has described a Universal Switching Fabric and a Universal Serial Link Termination as separate entities, but they can be combined in a single microprocessor. For example, a single microprocessor can terminate any of the above serial links described, and then provide the ATM switching in the same microprocessor concurrently. If desired, universal serial link termination, (any/all of the above links described in this document), can be coupled with the universal switching fabric, (any/all of the above fabrics discussed in this document), and operate concurrently in the same microprocessor. The multiple microprocessor configurations shown in FIG. 14 and FIG. 15, also apply. Of particular interest, is the coupling of periphery and switching fabric on the same microprocessor, and then extending a link to the center stage of FIG. 15 to provide a distributed fabric with Integrated periphery.

The above approach can be used to provide higher level combined switching functionality. An example is the implementation of the functionality of an entity such as a trunk only, 5ESS® Switching Module on a single microprocessor. This would include the TSI, the trunk terminations, the NCT interface to the TMS, service circuits such as tone generation implemented in a chip floating point decimal unit of the microprocessor, or vector manipulation unit as the hardware base. On the same microprocessor, the Switching Module Processor, (SMP), can be concurrently implemented, (either in native or emulation mode), for call processing and maintenance software, as the software base. For an SM, (Switching Module) that contains subscriber lines as well, all of the above can be used to support subscriber lines implemented in the conventional way, as well as the embedded trunk circuits.

The microprocessor can also be used to implement generalized logic function cost effectively, especially if they have a strong component of sequential logic. Thus, this approach can be very useful in providing the functionality presently implemented by a Field Programmable Gate Array (FPGA), and be more cost effective and provide more rapid deployment. This approach can also be used for replacing Application Specific Integrated Circuits (ASICs), and replace them with either a single or multiple microprocessor, depending on the application.

While the preferred embodiment shows sequential storage of input time-slots and readout based on the control memory contents, it is also possible to use storage based on control memory contents in conjunction with sequential readout, although such an arrangement handles broadcast connections less efficiently. The arrangement of FIG. 14 does not work satisfactorily for broadcasting in the non-preferred arrangement, (storage based on control memory and sequential readout), because for each input word that is received, different microprocessor may be required to do different amounts of processing.

The approach discussed herein has the inherent flexibility of stored program control. It can, therefore, be used to implement new and different protocols such as the Dynamic Synchronous Transfer Mode (DTM), recently proposed by the European Standards body.

RISC microprocessor technology is moving at a very fast pace. There are microprocessors operating at higher frequencies just beyond the horizon which will allow for higher capacities on a single chip. Moore's law will push these capabilities even further in the future.

FIGS. 17–20 illustrate a large switch whose core element is a switch 1700 for switching any input VT2 signal to any output VT2 signal. The switch is fed by a plurality of Access Interface Units (AIU), containing line cards for handling ADSL, (Asymmetric Digital Subscriber Lines) lines, line cards for handling Plain Old Telephone Service (POTS) lines, and trunk cards for handling input digital or analog trunks. The outputs of these cards are assembled as input streams which are, in turn, fed to a microprocessor based telecommunications switching network fabric element 100, such as that shown in FIG. 1. Modules 1711 and 1725 are narrowband modules, delivering and accepting narrowband (DS0) signals; modules 1710 aand 1720 are broadband modules, delivering and accepting broadband (VT2) signals. Module 1711 is connected only to POTS lines and/or ISDN lines, all of which communicate at DS0 rates, or below. Module 1710 is also connectible to ADSL, (Asymmetric Digital Subscriber Line) lines.

Each VT2 signal has a payload of 256 bits, and is generated at a repetition rate of 8 KHz per second. In addition to the 256 payload bits, there are two signaling bits, and one bit to distinguish a narrowband signal, (one with a payload of 8 bits), from a wide band signal, (one with a payload of some multiple, up to 32 8-bit bytes). An ISDN signal would be sent as three narrowband signals, because the two B-channels may go to different destinations, and the D-channel is connected to a packet switching unit. In this preferred embodiment, all narrowband signals are sent in the form described above; there is no bundling of narrowband signals into one VT2 signal. The reason is that the interface ports of the core fabric 1700 can only process signaling information for a single logical communication per physical VT2 channel.

The core fabric is also connected to broadband output interface unit (OIU) 1720, and narrowband OIU 1725, which interfaces with broadband transmission facilities, such as SONET/SDH. The SONET/SDH facility can, in turn, carry virtual trunks with packet switched signals such as ATM signals and IP signals, or circuit switched signals such as PCM signals. In case a communication leaves this switch, the connection is made between the VT2 connected to an AIU, such as 1710, or 1711, and a VT2 connected to an OIU, or between VT2s connected to OIUs.

In order to be compatible with an existing plant, such as the 5ESS® switch manufactured by Lucent Technologies Inc., the core fabric also can communicate with links such as the 5ESS® Network Control and Timing (NCT) links, connected to a communication module 1730 of a 5ESS® switch. When narrowband NCTs 1731 terminate on the core fabric, their signals are converted into VT2 signals. Broadband NCTs 1732 already carry VT2 signals. The core fabric is controlled by a switching module processor controller 1790, which communicates via channels of the fabric, both to control circuits within the fabric, and to control circuits in the AIU and OIU.

Figure 17:
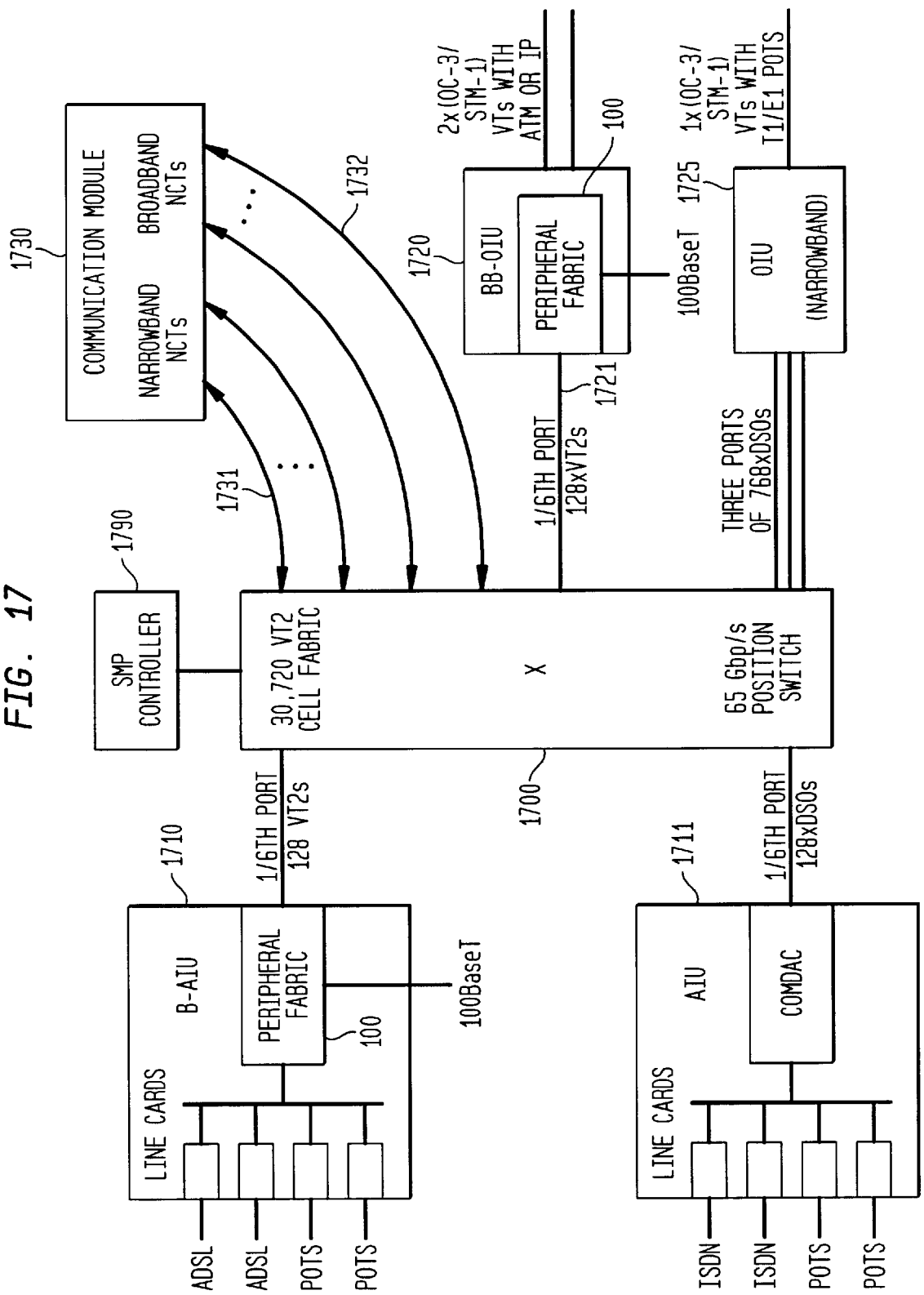
FIG. 17 is a detailed block diagram of such a 3-stage network.

For ease of understanding, FIG. 17 is drawn as if the line modules 1710 and 1711 were input modules, and the trunk modules 1720 and 1725, were output modules. Actually, the central cell fabric 1700 can switch signals from any port to any other port; thus, serving line-to-line traffic, and trunk-to-truck traffic, as well as line-to-trunk traffic. Also, the signals for any line or trunk are two-way signals. Thus, the modules 1710, 1711, 1720, and 1725 are all "input" modules to cell fabric 1700, and cell fabric makes hairpin connections between signals from any connected port to any other connected port. The fabric is a three-stage fabric: first, the module carrying a signal to the cell fabric; second, the cell fabric 1700; third, the module carrying a signal from the cell fabric.

Figure 18:
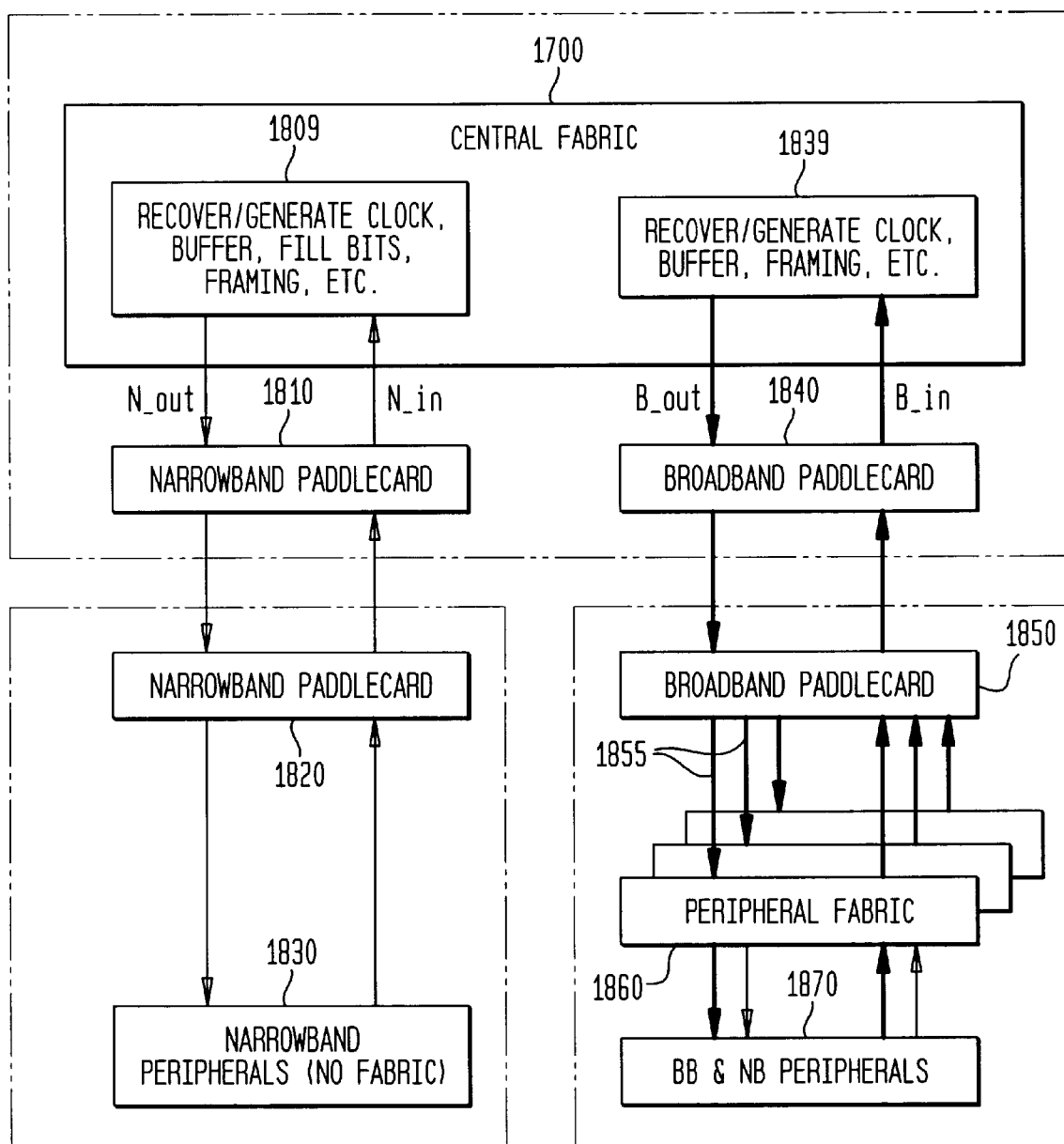
FIG. 18 shows details of the connections to the central fabric of FIG. 17.

FIG. 18 illustrates the connections between AIU units (1710 and 1711), and OIU units 1720 and 1725, and the core fabric 1700. Each connection to the central fabric is terminated on a port such as narrowband port 1809, and broadband port 1839. In the case of a narrowband port, the port must recover clock from the input signal, buffer the input, generate flow bits for the unoccupied 248 bits of the payload, perform framing, and receive information for controlling control registers of the port. In the case of the broadband port 1839, it is required to buffer the inputs, recover the clock, perform framing, and receive input information for control register. The narrowband peripherals, i.e., those peripherals generating narrowband signals such as peripherals 1830, which includes peripherals 1711 and 1725 are connected to the central fabric 1700 via a pair of paddlecards. The basic function of the paddlecard is to allow transmission either in the optic, or the electric domain, (and possible conversions between the two), to proceed over links of wire or optic fiber which require interface circuitry in order to recover synchronization and framing. The paddlecard can also provide a 1:N split of the VT2 stream so that N sets of peripheral fabric can be connected to one Broadband Port. This is given the notation 1855 in FIG. 18.

1830 contains hard-coded PCM circuit stream processing equipment, and no ability to do any kind of protocol processing or switching. This is in direct contrast to 1860 which actually interprets the bit stream, and each type of stream can be its own protocol, and can be packet, or circuit switched, per stream.

For broadband and narrowband peripherals that are housed, for example, in AIU or OIU, the peripheral 1870 feeds a fabric contained in an AIU such as 1710, or OIU such as 1720, which feeds a broadband paddlecard 1850, for transmission to a broadband paddlecard 1840 that interfaces with the central fabric 1700. The broadband paddlecard feeds a port 1839.

The 768 VT2s are split into 6 streams of 128 VT2s each. The main reason for this, is that 128 VT2s represents 250+

Mb/s of reading and writing from the stream, and 250+ Mb/s of reading and writing to the peripherals, for a total aggregate of reading and writing and protocol processing of 1 Gbps. This is a large amount of processing for 1999 multi-protocol, heterogenous processing. From a practical basis, this is a good size for being able to process all the different protocols for a single processor complex. This also is the most cost-effective modular unit from a scalability point of view. So, the central fabric's "N" ports actually drive "6*N" peripheral fabrics.

Central Fabric

The central fabric 1700 switches elements of VT2 size. VT2 (Virtual Tributary 2), is a SONET/SDH standard signal, having a payload with thirty-two time-slots per 8 KHz frame, or 256 bits per frame, 2,048,000 bits per second. Each VT2 is bi-directional with 2.048 Mb/s in each direction.

The central fabric has no knowledge of what type of service, or bit stream is in the VT2 cells. No interpretation of the bit stream is performed. From each port at each VT2 timeslot, the contents of the VT2 cell are copied to the appropriate outgoing port and correct timeslot, (TSI function).

The central fabric has the following types of ports:
N_in=Narrowband Input Port
N_out=Narrowband Output Port
B_in=Broadband Input Port
B_out=Broadband Output Port
AND the accompanying data paths:
N_in_N_out=Narrowband to Narrowband Path
N_in_B_out=Narrowband to Broadband Path
B_in_N_out=Broadband to Narrowband Path
B_in_B_out=Broadband to Broadband Path Given these definitions, the central fabric performs a simple copy according to the following rule:

Always copy a 32 byte, (256 bit), data quantity+signaling bits from input port to output port, regardless of how the ports are defined in the control RAM, or which of the above paths are defined. No concept of port types exits in the TSI itself.

The essence of supporting both types of ports is in the interface to Data RAM protocol. The N_in port will always copy the signaling bits and the data into the signaling bit storage, and the first 8 bits of the 256 bit data RAM. The remaining 248 bits are loaded with a "fill" pattern from internal resources. The B_in port will always copy the signaling bits and the data into the signaling bit storage, and all 256 bits of data. The N_out port will always read only the signaling bits, and the first 8 bits of RAM of the timeslot, out onto the link.

The B_out port is special. Here a special $259^{th}$ bit (an extra signaling bit), is written based on the control RAM storage. This bit tells whether the particular timeslot is a narrowband, or broadband service. In either case, all signaling and 256 bits are read onto the link. The paddlecard that connects the outgoing data to the peripherals may use the $259^{th}$ bit. If it is a broadband peripheral, the bit is ignored and all the bits are written on the optical link, and the issue of narrowband, or broadband service, is deferred to the peripheral fabric. If it is a broadband network interface, it actually has broadband and narrowband inter-SM connections on the same paddlecard. Each logical port has a narrowband timeslot, and a broadband timeslot. The narrowband timeslot is written if the $259^{th}$ bit indicates this is a narrowband service.

Figure 19:
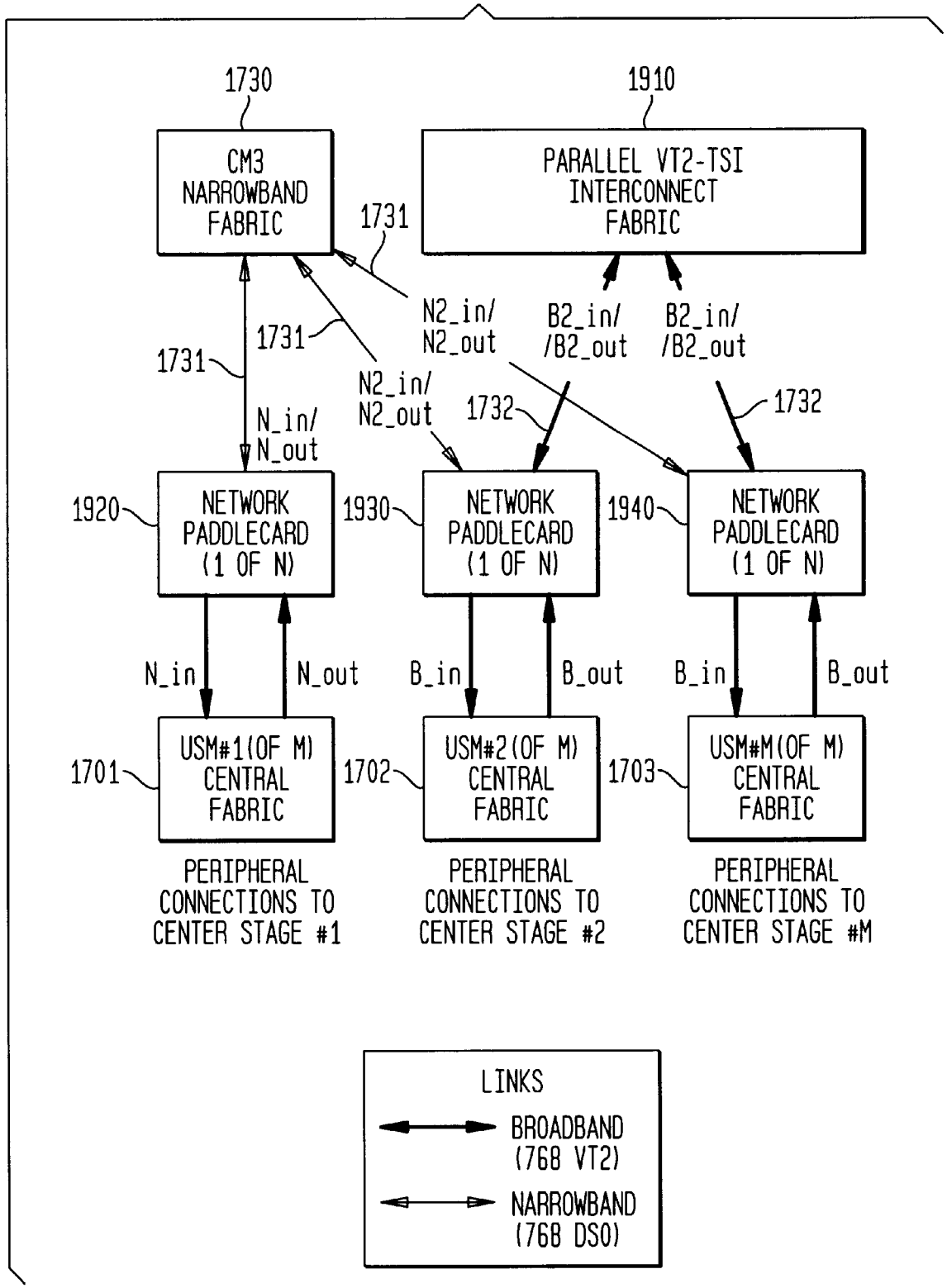
FIG. 19 shows arrangements for interconnecting a plurality of the central stages of FIG. 17.

As shown in FIG. 19, the narrowband service is then routed to a communication module, such as the CM3 of the 5ESS® switch manufactured by Lucent Technologies Inc., as it would be today, on an all-narrowband switch. The broadband timeslot to the Switch Center Stage Broadband Fabric is written with "fill" information. If the $259^{th}$ bit indicates this is a broadband service, then the broadband timeslot is written with the broadband service. This link is connected to the Switch Center Stage Broadband Fabric. The narrowband timeslot to the CM3 is written with the appropriate "fill" code. The $259^{th}$ bit is written by the broadband fabric connect order, to a "broadband service code". If the register is not written at the time of the connect order, the hardware default loads "narrowband service code" for the $259^{th}$ bit.

Broadband outputs of the Central Fabric 1700 for traffic between Central Fabrics are connected via paddlecards 1930 and 1940, to a Parallel VT2-TSI Interconnect Fabric 1910. The parallel VT2-TSI (1910) takes advantage of the multiplicity of ports that exit on the center stage (1700). There are "N" ports available on the center stage (1700), and typically, a balanced center stage has K=N/2 ports attached to peripherals, and K ports attached to the $2^{nd}$ stage central fabric (1910). The basic process of constructing a parallel TSI second stage, is to assign some of the K ports to each of "S" TSIs in the second stage. Multiple first level stages are interconnected by assigning some port(s) to each first level stage in each second level stage. The largest, economical scaling possible, is to cross-connect 2*K=N first level stages. In this configuration, each first level stage has connected all K network ports to K second level fabrics, with one port per second level fabric. Since the number of ports is actually N per center stage, N different first level stages can be interconnected. The total amount of peripheral ports, (also K=N/2), that can be interconnected by a multiplicity of N port first level stages, connected to K second level stages, and the first and second level stages are using identical parts, (this is the economical part), is K*N=N*N/2. In practical implementations, in 1999 technology, this results in a total interconnection capability of terabits per second.

Peripheral Fabric

The peripheral fabric exists to support broadband services, but also supports narrowband services. The units, (especially those supporting ADSL), will be simultaneously supporting narrowband and broadband services.

The peripheral fabric can handle any service on the VT2 cell payload. Services that are narrowband will be treated as if only the first byte of the VT2's 32 bytes of data are needed. Services that are broadband will use from 2 to 32 bytes of the VT2. This is defined on a per-service basis.

The peripheral fabric supports the following main types of broadband bandwidth classes:
VT2 dedicated
N×VT2 dedicated
VT2 shared (packet pipe)
N×VT2 shared (bigger packet pipe)

The peripheral fabric is created from processors and memory with actual software determining how the fabric is interpreted, and how the payloads in the fabric are interpreted. The fabric become "universal" because any software program can run any protocol on a per stream basis. This heterogeneous processing capability is supported in both best-effort, and zero-jitter, circuit quality varieties.

The peripheral fabric connects on one side to the central VT2 TSI fabric 1700, and on the other side with both narrowband and broadband peripherals. The peripheral fabric performs the appropriate bi-directional protocols on a per stream basis so that each customer flow is in the correct format, and going to the correct location.

Figure 20:
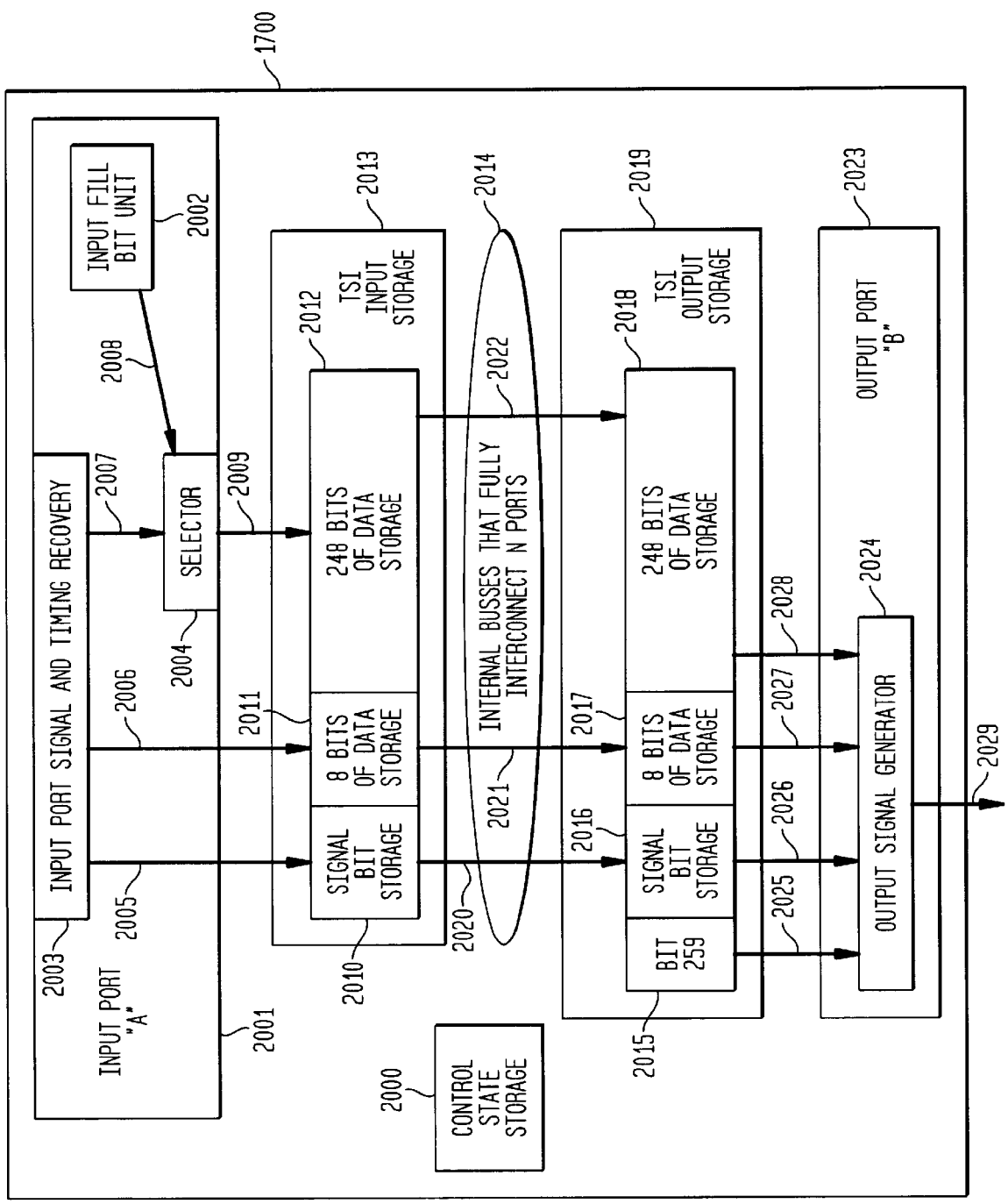
FIG. 20 is a more detailed block diagram of the core fabric of FIG. 17.

FIG. 20 is an expansion of the VT2 Cell Fabric (1700). The entire fabric consists of "P" ports. Each of the P ports can be set up to be narrowband or broadband. Each port supports an input and an output flow (bi-directional). Every payload can be routed from any incoming port "A" to any outgoing port "B". This includes the special case of loop-around, where A is equal to B.

Input Port A (2001) contains the Input Port Signal and Timing Recovery Unit (2003). This is programmed from information in the Control State Storage (2000) as to whether the port is conducting narrowband or broadband operations.

If the port is conducting narrowband operations, the Input Port Signal and Timing Recovery Unit will extract narrowband payloads from the incoming signal. For each narrowband payload, the following will occur: the payload will be copied into the appro-priate TSI input storage location (2013). In particular, the two bits of signal payload will be copied to the Signal Bit Storage (2010) via path (2005), and the 8 bits of narrowband payload will be copied to the storage (2011), via path (2006). In addition, no information exists to travel on path (2007) to the selector (2004), because it is narrowband. Instead, the selector (2004), takes "fill" from the Input Fill Bit Unit (2002), via path (2008), and puts it onto path (2009), for conveyance to storage (2012). 2010, 2011, and 2012, together constitute 2013.

If the port is conducting broadband operations, the Input Port Signal and Timing Recovery Unit will extract broadband payloads from the incoming signal. For each broadband payload, the following will occur: The payload will be copied into the appropriate TSI input storage location (2013). In particular, the two bits of signal payload will be copied to the Signal Bit Storage (2010), via path (2005), and the first 8 bits of broadband payload will be copied to the storage (2011), via path (2006). The remaining 248 bits of broadband pay-load travel on path (2007) to the selector (2040), and then onward to storage (2012), via path (2009). The incoming "$259^{th}$ bit" is absorbed in the Input Port Signal and Timing Recovery Unit (2003).

The data and signaling bits are transferred form input storage (2013), to output storage (2019), via internal busses (2014). The TSI output storage (2019) consists of Bit 259 (2015), Signal bit storage (2016), and data storage (2017 and 2018). The information in (2010) is sent to (2016), via path (2020). The information in (2011) is sent to (2017), via path (2021). The information in (2012) is sent to (2018), via path (2022). In addition, Bit 259 (2015), is loaded from control stage storage information (2000). Bit 259 contains the "broadband or narrowband service indicator".

The last step for generating the output port signal is to apply the specific information from the appropriate TSI output storage (2019), to Output Port B (2023), and specifically, the output port generator (2024).

If the output port B (2023) is programmed as a narrowband port, the output port generator (2024) will use the information from signal storage (2016), and data storage (2017), via paths (2026) and (2027), respectively. The signal will then be sent out on path (2029).

If the output port B (2023) is programmed as a broadband port, the output port generator (2024) will send out all the information on path (2029), received from the $259^{th}$ bit (2015), signal storage (2016), and data storage (2017 and 2018), by means of paths (2025, 2026, 2027, and 2028), respectively.

FIG. 20 shows only a single input time-slot and a single output time-slot of a signal memory for one port. The rest of the time-slots are not shown. In one preferred implementation, the memory for the multiple time-slots is housed within a single integrated circuit chip. The output of selected time-slot of the memory is routed over the bus system 2014 to a time-slot of the memory of a selected output port. The sequential time-slots of the memory are loaded sequentially, and selectively transmitted to a selected time-slot of a selected output port, or are loaded selectively, and sequentially transmitted to a selected time-slot memory of the selected output port. The selection process for each port is independent of the selection process of other ports, and is controlled by separate memory in the control stage storage.

If only a single input time-slot and output time-slot is used for each port, then Block 1700 becomes a Time Multiplexed Switch.

Time Multiplexed Switch (TMS) Core Fabric

In a variation on the architecture of FIG. 17, the Time-Slot Interchange Fabric (TSI), cell fabric (1700), is replaced by an n×64 Kbps Time Multiplexed Switch, (TMS). The TMS can allocate groups of 64 Kbps time-slot, (e.g., 128 Kbps, 384 Kbps, 1.5 Mbps, 2.0 Mbps, etc.), on any specific link. This implementation provides more granularity than the VT2 TSI (1700), i.e., less bandwidth is used for connections which are lower than 2.0 Mbps. Since the TMS is a space switch, the TSI functionality must be provided somewhere else. For the B-AIU (1710), and BB-OIU (1720), the peripheral fabric, (100), software is added to the microprocessor to provide the TSI function. The peripheral fabric has the real time capacity to be a 6000 time-slot TSI for a 300 MHz Power PC. The Peripheral Fabric 100 TSI voice call requirement, as shown in FIG. 17, is 128 voice calls, (128 maximum), of the thousand of time-slot capability of the peripheral fabric, (100). Thus, a minimum of 97% of the peripheral fabric real time is still available for ATM, IP, and other switching methods, and real time activity.

The AIU (1711), and OIU (1725), however, do not contain a peripheral fabric, and so the TSI functionality must be placed somewhere else. The microprocessor based TSI for the narrowband AIU and OIU, can be co-located with the TMS, and switch the 128× DS0s from multiple AIUs and OIUs. Multiple TSIs can be used, up to the capacity of the TMS. This architecture allows for a lower bandwidth position switch to be used as Peripheral Fabric 100, and would be appropriate and cost-effective, for example, for initial market penetration, where the percentage of customers using, or needing the full 2 Mbps, would be small, or modest. The same board could be used for the peripheral fabric, (100), and the TSI used for the narrowband TSI, with only a software difference.

Network Connections

The following half call scenarios, illustrates connections in the network.

Half Call Scenario 1: Narrowband Service on Narrowband Port

This is the simplest case. This is support for the current legacy narrowband interconnection between narrowband peripherals, and narrowband fabric. Remember that the broadband fabric can not tell that the service is narrow, and will automatically copy 32 bytes per frame. As was described earlier, the N_in and the N_out ports 1809, provide special capabilities to add in "fill", and subtract out "fill". The end result is that narrowband to narrowband connections are possible.

There are two flows in a narrowband service.

The first flow is in the direction of peripheral to central fabric. The second flow is in the direction of central fabric to peripheral. The first flow travels from the peripheral 1830 to the narrowband paddlecard 1820, for transmission to the central fabric 1700. The reader will note that it is common to provide one or more stages of concentration to reduce the number of narrowband ports that are needed, prior to paddlecard transmission. The narrowband link transmits a number of DS0 timeslots, with each timeslot also being appended with internal-specific signaling bits for reliability and other purposes. The narrowband link is terminated on another narrowband paddlecard 1810, at the central fabric. The next step is to send the bit stream to any N_in central fabric port 1809. At this point, the "half call" can be switched in the Central Fabric, as previously described.

The second flow is in the direction from the central fabric to narrowband peripherals. The bit stream will have been copied in the central fabric to the N_out port 1809 buffers, as previously described in the Central Fabric Section. From there, the bit stream is sent to the narrowband paddlecard for transmission to the peripherals' location. The stream will be terminated by another narrowband paddlecard 1820. Note that it is common to then place one or more fanout, (opposite of concentration), stages to expand a densely occupied timeslot stream into multiple sparsely occupied streams, each flowing to a particular multiplicity of peripherals on a specific sub-unit. The flow then continues to the actual peripherals 1830, themselves.

Half Call scenario 2: Narrowband Service on Broadband Port

There are two flows:

The first flow is from narrowband peripheral 1870 to broadband port (B_in). The narrowband stream flows to the peripheral fabric which can now perform the classic concentration function, without hardware stages. The peripheral fabric 1860, places the narrowband flows into their respective VT2s. In this case, only 1 of the 32 data bytes contains real information, the remaining 31 bytes contains "fill" for each stream. The peripheral fabric emits the flow to the broadband paddlecard 1850, which transmits the flow to the central fabric location where it is terminated on another broadband paddlecard 1840. This paddlecard then transmits the flow to a broadband input port, (B_in) 1839. As discussed earlier, in the Central Fabric Section, the entire VT2, (1 real, and 31 fill bytes), will be switched in the VT2 TSI. However, whether the other peripheral is broadband or narrowband does not matter. In either case, the correct byte will arrive eventually in the correct location of the VT2, or occupy an entire DS0.

The second flow is from broadband port (B_out) 1839, to narrowband peripheral. This is the more interesting direction. Recall that the B_out port has the special property that the paddlecards may, or may not, pay attention to the $259^{th}$ bit of each VT2 frame. In this case, the $259^{th}$ bit will have been set to narrowband in case this was an inter-USM, (or SM) port. In that case, the traffic would have been routed to the narrowband CM3. In this case, however, the bit is ignored since the decision as to how to handle each timeslot is deferred to the peripheral fabric 1860. So, the flow continues to the broadband paddlecard 1840, travels over the optical link to the peripherals' location, and is terminated on the peripheral fabric's paddlecard 1840. This paddlecard sends the flow to the peripheral fabric 1860, which then forwards the first byte of the VT2, and the appropriate signaling bits, to the narrowband peripherals 1870. Recall that the peripheral fabric can also perform a fanout function.

Half Call Scenario 3: Broadband Service on Broadband Port

There are two flows:

The first flow is from the broadband peripheral 1870, to central fabric broadband port, (B_in) 1839. Each broadband stream is transmitted to the peripheral fabric 1860. The peripheral fabric understands via provisioned, or dynamic connection order, what type of protocol is in the stream. The peripheral fabric performs the appropriate segmentation function, and puts the broadband stream into VT2 cells for transmission through the fabric. The flow continues through the paddlecards 1850 and 1840, all the way to the B_in port 1839. As previously described, the broadband flow is switched in the central fabric.

The second flow is from the central fabric broadband port (B_out) 1839, to the broadband peripheral 1870. The B_out stream is more interesting. Remember the $259^{th}$ bit here, will be set to "broadband for this stream. This is a peripheral paddlecard, so the $259^{th}$ bit is ignored, but also as previously described, if this was a network port, it would be appropriately routed. The flow goes out to the peripheral fabric 1860 via paddlecards 1840 and 1850, and upon arrival, is processed by the peripheral fabric. The peripheral fabric performs the appropriate re-assembly function from VT2 cells to output stream protocol format. The stream is then transmitted to the correct broadband peripheral 1870.

Half Call Scenario 4: Narrowband Service (Network-Side) on Broadband Port

This call scenario concerns internal (network) connections. These connections exist to allow the interconnection of a multiplicity of central fabrics. So, this represents a "internal half-call" that is not seen by the customer, but does actually exist, to carry out the interconnection of two customers in cases where one customer exists on one central fabric, and the other customer exists on a different central fabric. In these cases, a second level of central fabric, interconnects the first level of central fabrics.

There are two flows.

The first flow is 1731 from the narrowband interconnection, (second level) fabric 1730, to the input port, (B_in), of the first level central fabric. The first flow enters the paddlecard 1930 at port, (N2_in), a narrowband port. The paddlecard has two choices per timeslot. It can choose to use the information either N2_in, or B2_in. In this case, it will use N2_in, and copy the information signaling +8 bits of data to the stream heading to B_in. The paddlecard 1930 also has to append the remaining 31 bytes of "fill" to the timeslot, and insert the $259^{th}$ bit to say narrowband service, ($3^{rd}$ signaling bit). Once this is done, the stream continues to the B_in port, where it can then be copied to any other port as previously described.

One question remains in the above explanation. How did the paddlecard know that it needed to use N2_in's timeslot, rather than B2_in's, timeslot? The answer is that the stream leaving for N2_out, contained a timeslot signal bit, ($259^{th}$), set to "narrowband". This bit refreshed a storage register in the paddlecard ASIC, that is used by the "IN" stream state machine as a decision function. So, the outgoing stream's information contains the information for the corresponding input stream as well. This allows the TSI to manipulate the paddlecards on a per timeslot basis. Again, as a refresher, this allows the interworking with the legacy aspects of the system. The narrowband traffic does not know about the existence of broadband services. This is a great advantage because no rework for the existing applications is necessary, and universal fabric SMs can work with pre-universal fabric SMs by interworking data directly through the second level fabric without the applications knowing that anything is happening.

The second flow is from the output port, (B_out), of the first level central fabric 1702, to the narrowband interconnection, (second level), fabric 1730. The flow leaves the B_out port with the 259th bit set to narrowband. Upon arrival at the paddlecard 1930, the bit orders the ASIC to route it to the N2_out port. The first byte of data, and the signaling bits are placed in the N2_out stream. The remaining 31 bytes are ignored from N2_out's perspective. Simultaneously, the B2_out port is loaded with 32 bytes of fill data, since no valid information is present.

Half Call Scenario 5: Broadband Service (Network-Side) on Broadband Port

This call scenario concerns internal, (network), connections. These connections exist to allow the interconnection of a multiplicity of central fabrics. So, this represents a "internal half-call" that is not seen by the customer, but does actually exist, to carry out the interconnection of two customers in cases where one customer exists on one central fabric, and the other customer exists on a different central fabric. In these cases, a second level of central fabric interconnects the first level of central fabrics.

There are two flows.

The first flow 1732 is from the broadband interconnection, (second level) fabric 1910, to the input port, (B_in), of the first level central fabric 1702. The first flow enters the paddlecard 1930 at port, (B2_in), a broadband port. The paddlecard has two choices per timeslot. It can choose to use the information from either N2_in, or B2_in. In this case, it will use B2_in, and copy the signaling+256 bits of data to the stream heading to B_in. The paddlecard also has to insert the 259th bit to say broadband service, (3rd signaling bit). Once this is done, the stream continues to the B_in port where it can then be copied to any other port as previously described.

One question remains in the above explanation. How did the paddlecard 1930 know that it needed to use B2_in's timeslot, rather than N2_in's, timeslot? The answer is that the stream leaving for B2-out contained a per timeslot signal bit, (259th), set to "broadband". This bit refreshed a storage register in the paddlecard ASIC that is used by the "IN" stream state machine as a decision function. So, the outgoing stream's information contains the information for the corresponding input stream as well. This allows the TSI to manipulate the paddlecards on a per timeslot basis. Again, as a refresher, this allows the interworking with the legacy aspects of the system. The narrowband traffic does not know about the existence of broadband services. This is a great advantage, because no rework for the existing applications is necessary, and universal fabric SMs can work with pre-universal fabric SMs by interworking data directly through the second level fabric, without the applications knowing that anything is happening.

The second flow is from the output port, (B_out), of the first level central fabric 1702, to the broadband interconnection, (second level), fabric 1910. The flow leaves the B_out port with the 259th bit set to broadband. Upon arrival at the paddlecard, the bit orders the ASIC to route it to the B2_out port. All 32 bytes of data, and the signaling bits are placed in the B2_out stream. Simultaneously, the N2_out port is loaded with 1 byte of fill data, since no valid information is present.

Half Call Scenario 6: Narrowband Service (Network-Side) on Narrowband Port

This call scenario concerns internal, (network), connections. These connections exist to allow the interconnection of a multiplicity of central fabrics. So, this represents a "internal half-call" that is not seen by the customer, but does actually exist, to carry out the interconnection of two customers in cases where one customer exists on one central fabric, and the other customer exists on a different central fabric. In these cases, a second level of central fabric interconnects the first level of central fabrics.

There are two flows.

The first flow 1731, is from the narrowband interconnection, (second level) fabric (CM3) 1730, to the input port, (N_in), of the first level central fabric 1701. The first flow gets to the first level fabric via transit through the narrowband paddlecard, (NCT2/3 termination). The N_in port performs the fill bit operations, etc., as previously described, so that the narrowband payload and signaling are mapped into the VT2, and signaling storage. Once this is done, the stream can then be copied to any other port, as previously described.

The second flow 1731, is from the output port, (N_out), of the first level central fabric 1701, to the narrowband interconnection, (second level), fabric. The N_out port performs the appropriate extraction of the DS0 payload and signaling bits from the internal VT2+signaling format of the TSI. The flow then leaves the N_out port of the fabric, and proceeds to the second level central fabric via the narrowband paddlecard, (NCT2/3).

The paddlecard can also provide a 1: N split of the VT2 stream so that N sets of peripheral fabric can be connected to one Broadband Port. This is given the notation 1855 in FIG. 18. 1830 contains hard-coded PCM circuit stream processing equipment, and no ability to do any kind of protocol processing, or switching. This is in direct contrast to 1860 which actually interprets the bit stream, and each type of stream can be its own protocol and can be packet, or circuit switched, per stream.

The 768 VT2s are split into 6 streams of 128 VT2s each. The main reason for this is, that 128 VT2s represents 250+ Mb/s of reading and writing from the stream, and 250+ Mb/s of reading and writing to the peripherals, for a total aggregate of reading and writing and protocol processing, of 1 Gbps. This is a large amount of processing for 1999 multi-protocol, heterogenous processing. From a practical basis, this is a good size for being able to process all the different protocols for a single processor complex. This also is the most cost effective modular unit from a scalability point of view. So, the central fabric's "N" ports actually drive "6*N" peripheral fabrics.

CONCLUSION

The above description is of one of preferred embodiments of Applicants' invention. Many other embodiments will be apparent to those of ordinary skill in the art without departing from the scope of Applicants' invention. The scope of the invention is limited only by the attached Claims.

What is claimed is:

1. A telecommunications switching network, comprising:
a plurality of modules for accepting input signals having different protocols, and for generating output signals encapsulated in a specified protocol;
a central stage switch for switching signals in said specified protocol from input ports of said central stage switch to output ports of said central stage switch; and
said plurality of modules for converting signals of said output ports in said specified protocol to any of said plurality of protocols of said input signals;
characterized in that:
said central state switch comprises apparatus for switching only broadband signals, and comprises apparatus for converting narrowband signals transmitted to said central stage switch into broadband signals, one broadband signal for each narrowband signal;

network further comprising: apparatus for adding an indicator to all signals converted from narrowband signals into broadband signals at said central stage switch to differentiate between broadband signals and narrowband signals.

2. The network of claim 1, wherein said indicator is an extra bit.

3. The network of claim 1, wherein said central stage switch comprises apparatus for adding fill bits to received narrowband signals.

4. The network of claim 1, wherein said central stage is a time-slot interchange switch.

5. The network of claim 1, wherein said central stage is a time multi-plexed switch.

6. The network of claim 1, further comprising:
   at least one additional one of said telecommunication switching networks;
   wherein, the central stage switch of each said telecommunication switching network is connected to at least one separate communication module for interconnection with other central stage switches.

7. The network of claim 6, wherein one of said separate communication modules is a time multiplexed switch.

8. The network of claim 6, wherein one of said separate communication modules is a time-slot interchange switch.

9. The network of claim 6, wherein said input signals comprise narrowband and broadband signals, and wherein one of said separate communication modules is for switching broadband signals.

10. The network of claim 1, wherein said input signals comprise multiplexed signals from analog POTS, (Plain Old Telephone Service) lines.

11. The network of claim 1, wherein said input signals comprise ATM, Asynchronous Transfer Mode, signals.

12. The network of claim 1, wherein said input signals comprise IP, Internet Protocol, signals.

13. The network of claim 1, wherein said input signals comprise frame relay signals.

14. The network of claim 1, wherein said input signals comprise pulse code modulation, PCM, signals.

15. The network of claim 1, wherein ones of said input modules receive inputs from analog narrowband telephone lines and Asymmetrical Digital Subscriber, ADSL, lines.

* * * * *